(12) United States Patent
Ueda et al.

(10) Patent No.: US 10,944,810 B2
(45) Date of Patent: Mar. 9, 2021

(54) SYSTEM, SERVICE DETERMINING METHOD, AND COMPUTER PROGRAM PRODUCT

(71) Applicants: Kenji Ueda, Kanagawa (JP); Takenori Oku, Tokyo (JP); Hiroshi Nishida, Kanagawa (JP); Satoshi Hatanaka, Kanagawa (JP); Takeyoshi Sekine, Tokyo (JP); Yasushi Nakazato, Tokyo (JP); Fumihiro Nagano, Kanagawa (JP); Tetsutaro Oishi, Kanagawa (JP); Kazuho Satoh, Kanagawa (JP)

(72) Inventors: Kenji Ueda, Kanagawa (JP); Takenori Oku, Tokyo (JP); Hiroshi Nishida, Kanagawa (JP); Satoshi Hatanaka, Kanagawa (JP); Takeyoshi Sekine, Tokyo (JP); Yasushi Nakazato, Tokyo (JP); Fumihiro Nagano, Kanagawa (JP); Tetsutaro Oishi, Kanagawa (JP); Kazuho Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 15/177,794

(22) Filed: Jun. 9, 2016

(65) Prior Publication Data
US 2016/0380847 A1 Dec. 29, 2016

(30) Foreign Application Priority Data

Jun. 23, 2015 (JP) .............................. JP2015-125952

(51) Int. Cl.
*H04L 29/08* (2006.01)
*G06F 11/07* (2006.01)
(Continued)

(52) U.S. Cl.
CPC ......... *H04L 67/10* (2013.01); *G03G 15/5079* (2013.01); *G03G 15/55* (2013.01);
(Continued)

(58) Field of Classification Search
CPC ...... G06F 3/121; G06F 3/1229; G06F 3/1285; G06F 11/0733; G06F 3/0484;
(Continued)

(56) References Cited

U.S. PATENT DOCUMENTS 6,042,111 A * 3/2000 Rivers ...................... B65H 7/06
271/270
7,076,400 B2 * 7/2006 Dulberg .................... G06F 9/54
702/184
(Continued)

FOREIGN PATENT DOCUMENTS

JP  2002-236576 A  8/2002
JP  2004-037941     2/2004
(Continued)

OTHER PUBLICATIONS

Japanese Office Action dated Sep. 25, 2018 for Japanese Application No. 2015-125952.

*Primary Examiner* — Mohamed A. Wasel
*Assistant Examiner* — Rachel J Hackenberg
(74) *Attorney, Agent, or Firm* — Harness, Dickey and Pierce, P.L.C.

(57) ABSTRACT

A system includes a device and one or more information processing apparatuses. The device includes a device-information generator configured to generate device information on the device; and an analyzer determining unit configured to determine any one of the device and the one or more information processing apparatuses as an analyzer for the device information. The one determined as the analyzer includes an analysis unit configured to perform an analysis
(Continued)

based on the device information; and a service determining unit configured to determine a service to the device based on a result of the analysis.

17 Claims, 17 Drawing Sheets

(51) Int. Cl.
 *G06F 3/12* (2006.01)
 *G03G 15/00* (2006.01)
(52) U.S. Cl.
 CPC ............ *G06F 3/121* (2013.01); *G06F 3/1229* (2013.01); *G06F 3/1285* (2013.01); *G06F 11/0733* (2013.01)
(58) Field of Classification Search
 CPC ...... G06F 3/016; G06F 3/1204; G06F 3/1205; G06F 3/1207; G06F 3/1224; G06F 3/1256; G06F 3/1259; G06F 3/1275; G06F 3/1287; G06F 3/1288; G05B 23/0283; G05B 23/0259
 See application file for complete search history.

(56) References Cited

U.S. PATENT DOCUMENTS

| | | | |
|---|---|---|---|
| 7,148,979 B1* | 12/2006 | Yanagawa | G06F 11/0733 358/1.15 |
| 9,304,435 B2* | 4/2016 | Thacker | G03G 15/556 |
| 2002/0049839 A1* | 4/2002 | Miida | G06F 11/3013 709/224 |
| 2003/0037287 A1 | 2/2003 | Nakamura et al. | |
| 2008/0310864 A1 | 12/2008 | Katoh | |
| 2011/0216359 A1 | 9/2011 | Kamisuwa et al. | |
| 2013/0260691 A1* | 10/2013 | Hintermeister | G06F 17/30876 455/41.2 |

FOREIGN PATENT DOCUMENTS

| | | |
|---|---|---|
| JP | 2007-325194 A | 12/2007 |
| JP | 2011-181073 | 9/2011 |
| JP | 4943241 | 3/2012 |

* cited by examiner

| USER IDENTIFICATION INFORMATION | PRIORITY INFORMATION |
|---|---|
| USER A | 1 |
| USER B | 3 |
| ⋮ | ⋮ |

SYSTEM, SERVICE DETERMINING METHOD, AND COMPUTER PROGRAM PRODUCT

CROSS-REFERENCE TO RELATED APPLICATION

The present application claims priority under 35 U.S.C. § 119 to Japanese Patent Application No. 2015-125952 filed on Jun. 23, 2015. The contents of which are incorporated herein by reference in their entirely.

BACKGROUND OF THE INVENTION

1. Field of the Invention

The present invention relates to a system, a service determining method, and a computer program product.

2. Description of the Related Art

Conventionally, there is known a technology where a maintenance management server remotely collects information from an image forming apparatus placed in a client environment, and sends a maintenance personnel to have him/her perform maintenance work when detected any abnormality, and analyzes the collected information to estimate the time to replace a consumable part and make a plan for preventive maintenance of consumable parts (maintenance before consumable parts are used up) (for example, see Japanese Patent No. 4943241).

However, in such a conventional technology as described above, an entity that performs the analysis of collected information and the determination of a service is fixed on the maintenance management server; therefore, it is difficult to meet a wide range of demands from users, maintenance staff, etc. on the provision of a service.

SUMMARY OF THE INVENTION

According to one aspect of the present invention, a system includes a device and one or more information processing apparatuses. The device includes a device-information generator configured to generate device information on the device; and an analyzer determining unit configured to determine any one of the device and the one or more information processing apparatuses as an analyzer for the device information. The one determined as the analyzer includes an analysis unit configured to perform an analysis based on the device information; and a service determining unit configured to determine a service to the device based on a result of the analysis.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
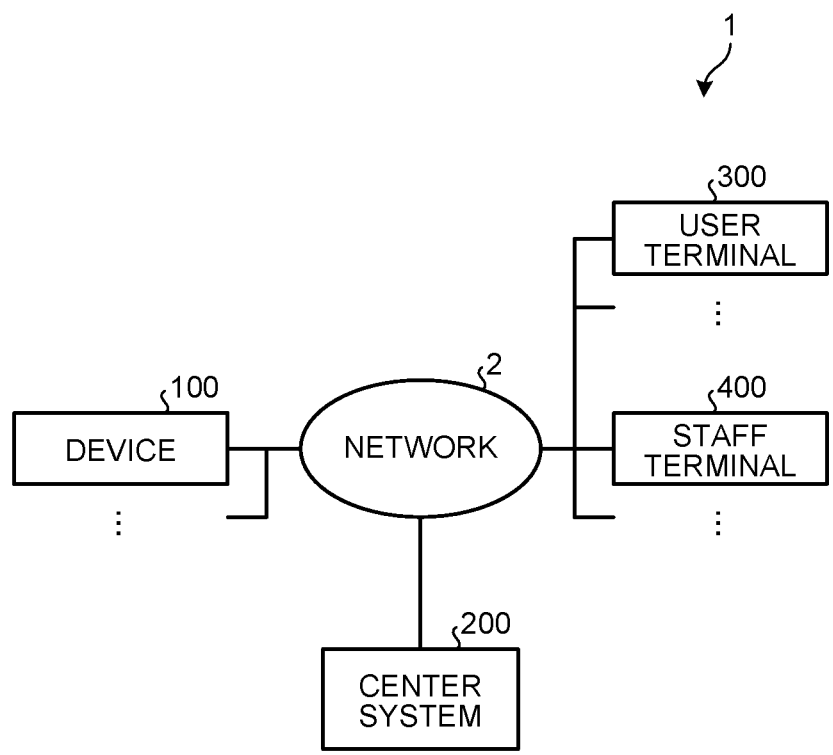
FIG. 1 is a block diagram showing an example of a configuration of a system according to a first embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a system, a service determining method, and a computer program product that enable to meet a wide range of demands on the provision of a service.

Exemplary embodiments of a system and service determining method according to the present invention are described in detail below with reference to accompanying drawings.

First Embodiment

FIG. 1 is a block diagram showing an example of a configuration of a system 1 according to a first embodiment. As shown in FIG. 1, the system 1 includes devices 100, a center system 200 (an example of an information processing apparatus and an information processing system), user terminals 300 (an example of an information processing apparatus), and staff terminals 400 (an example of an information processing apparatus).

The devices 100, the center system 200, the user terminals 300, and the staff terminals 400 are connected via a network 2. The network 2 can be realized by, for example, the Internet, a local area network (LAN), etc.

The devices 100 are a device that is placed in a user (client) environment and is an object to be managed. The devices 100 include, for example, image forming apparatuses such as printing devices, copiers, multifunction peripherals (MFPs), scanner devices, and facsimile machines, various electronic devices such as projectors, cameras, air conditioners, refrigerators, fluorescent lights, vending machines, and handheld terminals, and personal computers (PCs). An MFP is a device having at least two of the following functions: copy function, print function, scanner function, and facsimile function.

In the first embodiment, there is described an example in which the devices 100 are image forming apparatuses that can be connected to the network 2; however, the devices 100 are not limited to this example. For example, some devices 100 can be a device that is not connected to the network 2. Incidentally, in the example shown in FIG. 1, only one device 100 is depicted; however, actually, there exist multiple devices 100.

The center system 200 is a system that a maintenance company of the devices 100 operates, and is composed of one or more computers. The center system 200 manages the state of each device 100, thereby determines a service to the device 100. However, in the first embodiment, a service to a device 100 can be determined in the device 100, a user terminal 300, and a staff terminal 400 as well.

The user terminals 300 are terminals used by users of the devices 100 (specifically, user-side administrators of the devices 100); the user terminals 300 include, for example, smart devices and PCs. Each user terminal 300 displays thereon service information on a service determined by the user terminal 300 or the center system 200, thereby supports a user to perform maintenance on a device 100. Incidentally, in the example shown in FIG. 1, only one user terminal 300 is depicted; however, actually, there can exist multiple user terminals 300 (for example, as many user terminals 300 as the number of user-side administrators of devices 100).

The staff terminals 400 are terminals used by maintenance staff (hereinafter, referred to as "customer engineer(s)") of the devices 100; the staff terminals 400 include, for example, smart devices and PCs. Incidentally, the customer engineers are engineers who belong to the maintenance company that operates the center system 200 and actually perform maintenance on the devices 100. Each staff terminal 400 displays thereon service information on a service determined by the staff terminal 400 or the center system 200, thereby supports a customer engineer to perform maintenance on a device 100. Incidentally, in the example shown in FIG. 1, only one staff terminal 400 is depicted; however, actually, there exist multiple staff terminals 400 (for example, as many staff terminals 400 as the number of customer engineers).

Figure 2:
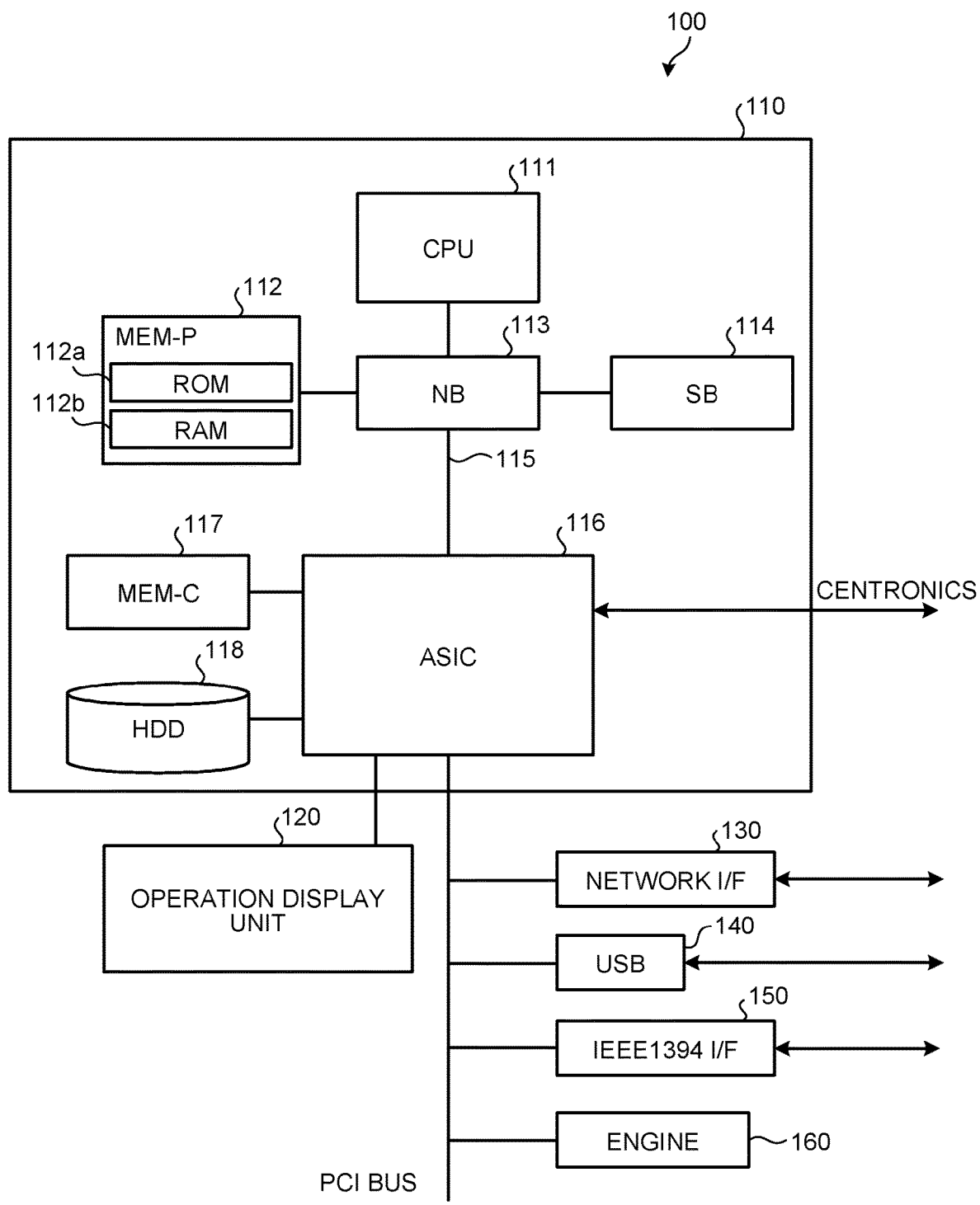
FIG. 2 is a block diagram showing an example of a hardware configuration of a device according to the first embodiment.

FIG. 2 is a block diagram showing an example of a hardware configuration of any device 100 according to the first embodiment. As shown in FIG. 2, the device 100 has a configuration in which a controller 110 and an engine unit (Engine) 160 are connected by a PCI bus. The controller 110 is a controller that performs the overall control of the entire device 100 and controls the drawing, the communication, and the input from an operation display unit 120. The engine unit 160 is an engine that can be connected to the PCI bus, and is, for example, a printer engine, such as a black-and-white plotter, a 1-drum color plotter, or a 4-drum color plotter, or a scanner engine, such as a scanner. The engine unit 160 also includes an image processing part, which performs error diffusion, gamma conversion, etc., in addition to the above-mentioned engine part.

The controller 110 includes a central processing unit (CPU) 111, a North Bridge (NB) 113, a system memory (MEM-P) 112, a South Bridge (SB) 114, a local memory (MEM-C) 117, an application specific integrated circuit (ASIC) 116, and a hard disk drive (HDD) 118; the NB 113 and the ASIC 116 are connected by an accelerated graphics port (AGP) bus 115. The MEM-P 112 includes a read-only memory (ROM) 112a and a random access memory (RAM) 112b.

The CPU 111 performs the overall control of the device 100, and has a chipset composed of the NB 113, the MEM-P 112, and the SB 114. The CPU 111 is connected to other devices via this chipset.

The NB 113 is a bridge for connecting the CPU 111 to the MEM-P 112, the SB 114, and the AGP bus 115, and includes a memory controller, which controls the read/write to the MEM-P 112 etc., a PCI master, and an AGP target.

The MEM-P 112 is a system memory used as a memory for storing programs or data therein, a memory for unpacking the programs or data, a memory used for drawing by a printer, etc., and is composed of the ROM 112a and the RAM 112b. The ROM 112a is a read-only memory used as a memory for storing programs or data therein. The RAM 112*b* is a read/write memory used as a memory for unpacking the programs or data, a memory used for drawing by a printer, etc.

The SB 114 is a bridge for connecting the NB 113 to PCI devices and peripheral devices. The SB 114 is connected to the NB 113 via the PCI bus, and a network interface (I/F) 130 etc. is also connected to the PCI bus.

The ASIC 116 is an image-processing-purpose integrated circuit (IC) that includes hardware components for image processing, and has a role as a bridge for connecting the AGP bus 115, the PCI bus, the HDD 118, and the MEM-C 117 to one another. The ASIC 116 is composed of a PCI target and AGP master, an arbiter (ARB) that is the core of the ASIC 116, a memory controller that controls the MEM-C 117, a plurality of direct memory access controllers (DMACs) that performs the rotation of image data etc. according to hardware logic or the like, and a PCI unit that performs data transfer between the controller 110 and the engine unit 160 via the PCI bus. A USB 140 and an IEEE 1394 (the Institute of Electrical and Electronics Engineers 1394) I/F 150 are connected to the ASIC 116 via the PCI bus. The operation display unit 120 is directly connected to the ASIC 116.

The MEM-C 117 is a local memory used as a copying image buffer and a code buffer. The HDD 118 is storage used for the accumulation of image data, the accumulation of programs, the accumulation of font data, and the accumulation of forms.

The AGP bus 115 is a bus interface for graphics accelerator card that is proposed to make graphics processing faster, and accelerates a graphics accelerator card by having a direct access to the MEM-P 112 at high throughput.

Figure 3:
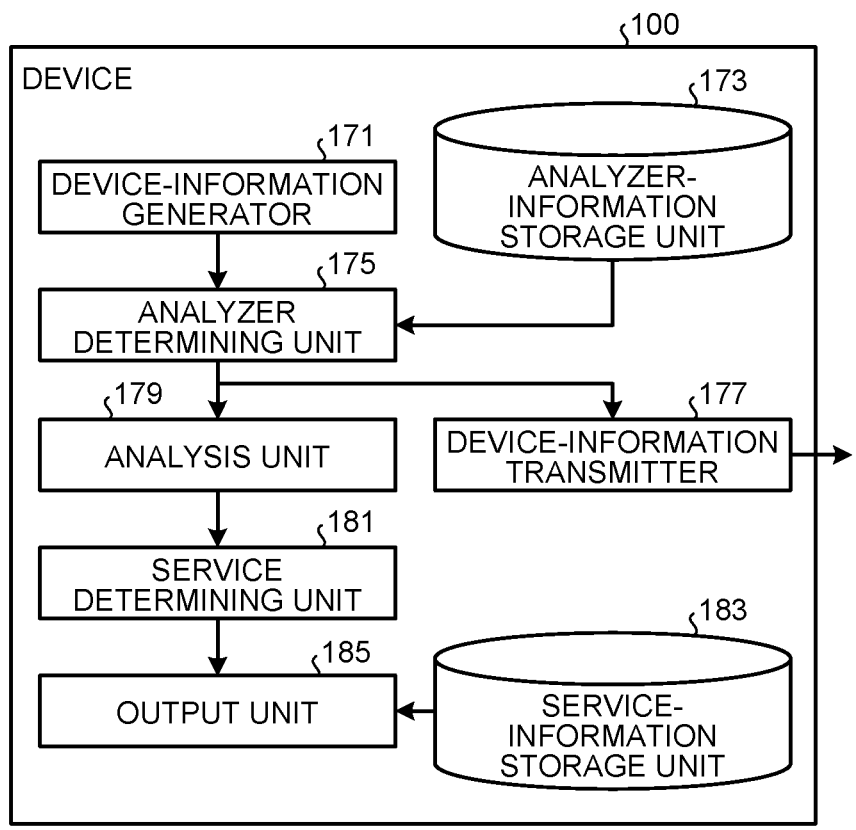
FIG. 3 is a block diagram showing an example of a functional configuration of the device according to the first embodiment.

FIG. 3 is a block diagram showing an example of a functional configuration of any device 100 according to the first embodiment. As shown in FIG. 3, the device 100 includes a device-information generator 171, an analyzer-information storage unit 173, an analyzer determining unit 175, a device-information transmitter 177, an analysis unit 179 (an example of a fourth analysis unit), a service determining unit 181 (an example of a fourth service determining unit), a service-information storage unit 183, and an output unit 185 (an example of a fourth output unit).

The device-information generator 171, the analyzer determining unit 175, the analysis unit 179, the service determining unit 181, and the output unit 185 can be realized by, for example, the CPU 111 and the MEM-P 112. The analyzer-information storage unit 173 and the service-information storage unit 183 can be realized by, for example, the MEM-P 112. The device-information transmitter 177 can be realized by, for example, the CPU 111, the MEM-P 112, and the network I/F 130.

The device-information generator 171 generates device information on the device 100. Specifically, the device-information generator 171 monitors the device 100 and generates device information of the device 100.

The device information includes device identification information identifying the device 100, state information on the state of the device 100, etc. The device identification information is, for example, a serial number, a model name, a MAC address, etc. The state information is, for example, failure information on a failure that occurred in the device 100.

For example, if a failure is paper jam, failure information includes the date and time of the occurrence of the failure, a part number of a paper feeding roller that fed sheets of paper, information for estimating a slip amount of a sheet fed by the paper feeding roller, the cumulative number of sheets fed by the paper feeding roller, etc.

The paper jam is a failure caused mainly by slipping of a sheet while fed by a paper feeding roller. Furthermore, the slipping of a sheet while fed by a paper feeding roller tends to occur more frequently with decreasing friction coefficient μ of the paper feeding roller due to the wear and tear of the paper feeding roller. Therefore, information as described above is given as failure information.

However, failure information is not limited to the above-mentioned examples; failure information can be any information as long as the information is about a failure that may occur in the device 100. Furthermore, the state information is not limited to failure information; for example, the state information can be consumable-parts information on consumable parts used in the device 100, or can include both failure information and consumable-parts information. Moreover, the state information can include a history of a predetermined number of pieces of past information in addition to the latest information. Furthermore, the device information can include user identification information identifying a user of the device 100.

The analyzer-information storage unit 173 stores therein analyzer information that indicates an analyzer of the device information generated by the device-information generator 171. The analyzer information is, for example, a flag that indicates the analyzer of the device information.

In the first embodiment, the devices 100, the center system 200, the user terminals 300, and the staff terminals 400 all have a device-information analysis function, so analyzer information shall indicate any one of a device 100, the center system 200, a user terminal 300, and a staff terminal 400 as an analyzer; however, candidates for the analyzer are not limited to these.

Even a device 100, the center system 200, a user terminal 300, and a staff terminal 400 can be excluded from the analyzer if they have no device-information analysis function. For example, if the center system 200, a user terminal 300, and a staff terminal 400 have the device-information analysis function and a device 100 has no device-information analysis function, analyzer information indicates any one of the center system 200, the user terminal 300, and the staff terminal 400.

Furthermore, in the first embodiment, out of a device 100, the center system 200, a user terminal 300, and a staff terminal 400, which one of them analyzer information indicates is determined by a user or a customer engineer. Specifically, a user or a customer engineer performs an input operation through the operation display unit 120 to determine any one of a device 100, the center system 200, a user terminal 300, and a staff terminal 400 as an analyzer indicated in analyzer information, thereby the analyzer indicated in analyzer information stored in the analyzer-information storage unit 173 is determined (updated).

The analyzer determining unit 175 determines an analyzer of the device information generated by the device-information generator 171. Specifically, the analyzer determining unit 175 determines an analyzer of the device information generated by the device-information generator 171 on the basis of the analyzer information stored in the analyzer-information storage unit 173.

In the first embodiment, as described above, the analyzer information indicates any one of the device 100, the center system 200, a user terminal 300, and a staff terminal 400 as the analyzer; therefore, the analyzer determining unit 175 determines the one indicated in the analyzer information, i.e., the device 100, the center system 200, the user terminal 300, or the staff terminal 400 as the analyzer.

When any one of the center system 200, the user terminal 300, and the staff terminal 400 has been determined as the analyzer, the device-information transmitter 177 transmits the device information generated by the device-information generator 171 to the determined analyzer.

On the other hand, when the device 100 has been determined as the analyzer, the analysis unit 179 performs an analysis based on the device information generated by the device-information generator 171. For example, if failure information included in the device information indicates paper jam, the analysis unit 179 estimates a slip amount from information for estimating a slip amount.

Furthermore, for example, if the information for estimating a slip amount is a time between the start of the feeding of a sheet of paper and the detection of the sheet by a sheet detection sensor located on a sheet conveyance path, the analysis unit 179 estimates a slip amount from a difference between the time and a predetermined time (a time required in a condition of no slipping of a sheet occurred). The larger the slip amount, the longer the time between the start of the feeding of a sheet of paper and the detection of the sheet by the sheet detection sensor located on the sheet conveyance path; therefore, the larger the time difference, the larger the slip amount is estimated to be. In this regard, the time between the start of the feeding of a sheet of paper and the detection of the sheet by the sheet detection sensor located on the sheet conveyance path can be calculated as the average or variance of the time by using past information.

Moreover, for example, if the information for estimating a slip amount is a value of voltage applied to rotate the paper feeding roller at a predetermined number of revolutions, the analysis unit 179 estimates a slip amount from a difference between the value of voltage and a predetermined value of voltage (a value of voltage applied to rotate the paper feeding roller at the predetermined number of revolutions in a condition of no slipping of a sheet occurred). The larger the slip amount, the lower the friction coefficient $\mu$ of the paper feeding roller becomes and the lower the value of voltage applied to rotate the paper feeding roller at the predetermined number of revolutions becomes; therefore, the larger the difference in value of voltage, the larger the slip amount is estimated to be. In this regard, the value of voltage applied to rotate the paper feeding roller at the predetermined number of revolutions can be calculated as the average or variance of the value of voltage by using past information.

Furthermore, for example, if the information for estimating a slip amount is the number of revolutions of the paper feeding roller when being rotated at the predetermined value of voltage, the analysis unit 179 estimates a slip amount from a difference between the number of revolutions and a predetermined number of revolutions (the number of revolutions of the paper feeding roller when being rotated at the predetermined value of voltage in a condition of no slipping of a sheet occurred). The larger the slip amount, the lower the friction coefficient $\mu$ of the paper feeding roller becomes and the larger the number of revolutions of the paper feeding roller when being rotated at the predetermined value of voltage becomes; therefore, the larger the difference in the number of revolutions, the larger the slip amount is estimated to be. In this regard, the number of revolutions of the paper feeding roller when being rotated at the predetermined value of voltage can be calculated as the average or variance of the number of revolutions by using past information.

However, a method for the analysis is not limited to the above-described examples.

The service determining unit 181 determines a service to the device 100 on the basis of a result of the analysis performed by the analysis unit 179.

For example, when a result of the analysis performed by the analysis unit 179 is a slip amount described above, if the slip amount is equal to or more than a first threshold and less than a second threshold (the first threshold<the second threshold), the service determining unit 181 determines cleaning of the paper feeding roller as a maintenance service; if the slip amount is equal to or more than the second threshold, the service determining unit 181 determines replacement of the paper feeding roller as a maintenance service.

Furthermore, for example, when a result of the analysis performed by the analysis unit 179 is a slip amount, if the slip amount is equal to or more than a third threshold and the cumulative number of sheets fed included in the device information is less than a fourth threshold, the service determining unit 181 determines cleaning of the paper feeding roller as a maintenance service; if the slip amount is equal to or more than the third threshold and the cumulative number of sheets fed included in the device information is equal to or more than the fourth threshold, the service determining unit 181 determines replacement of the paper feeding roller as a maintenance service.

However, a service determining method is not limited to the above-described examples.

The service-information storage unit 183 stores therein service information on a service indicated by service identification information with respect to each piece of service identification information identifying a service. The service information is information indicating the content of a service; if the service is a maintenance service as in the first embodiment, the service information is information indicating the content of maintenance. For example, if the service is cleaning of a paper feeding roller, the service information is information indicating a way to clean the paper feeding roller.

Incidentally, the content of a service indicated in service information stored in the service-information storage unit 183 is appropriate for people who refer to the service information through the device 100. Specifically, people who refer to service information using a device 100 in order to maintain the device 100 are thought to be either users or customer engineers of the device 100; therefore, service information stored in the service-information storage unit 183 is intended for both users and customer engineers of the device 100.

In the case of users, any user generally has poor knowledge of how to perform maintenance on the device 100, so it is necessary to explain a maintenance method in a plain and simple manner; on the other hand, in the case of customer engineers, any customer engineer is generally knowledgeable about how to perform maintenance on the device 100, so it is not necessary to explain a maintenance method in a plain and simple manner. Accordingly, service information stored in the service-information storage unit 183 of the device 100, which is intended for both users and customer engineers, explains the content of maintenance at a level intended for "average" if people who refer to service information are classified into three groups of high, average, and low according to their knowledge of maintenance on the device 100.

The output unit 185 outputs service information on a service determined by the service determining unit 181. Specifically, the output unit 185 acquires service information of a service determined by the service determining unit 181 from the service-information storage unit 183, and outputs the acquired service information to the operation display unit 120. Accordingly, the output unit 185 outputs the service information appropriate for users and customer engineers.

Figure 4:
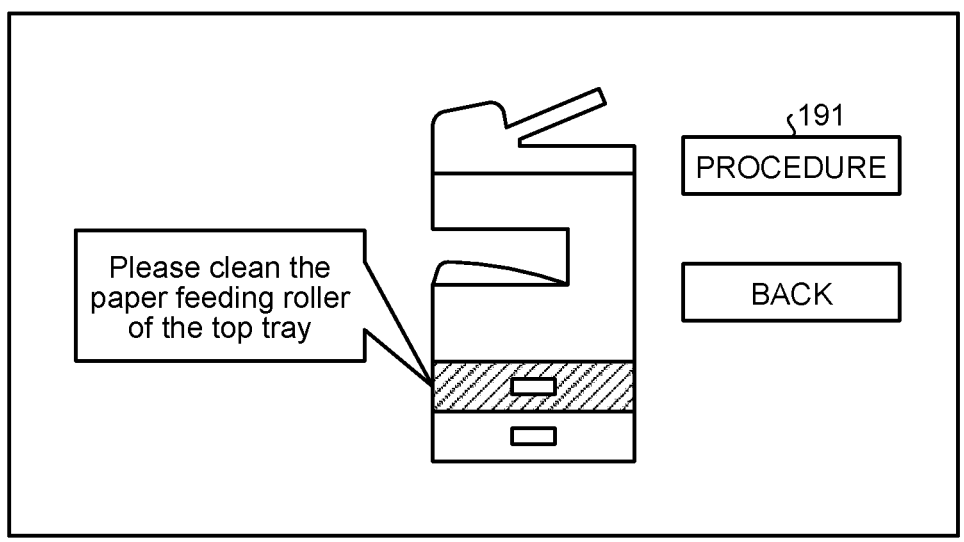
FIG. 4 is a diagram showing an example of service information output from an output unit according to the first embodiment.
Figure 5:
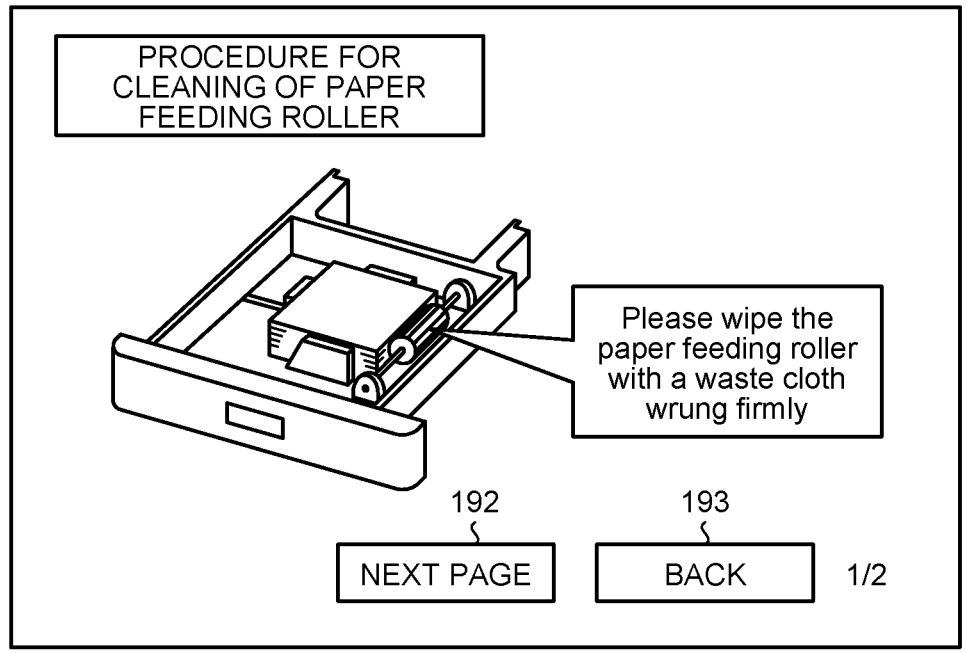
FIG. 5 is a diagram showing the example of the service information output from the output unit according to the first embodiment.
Figure 6:
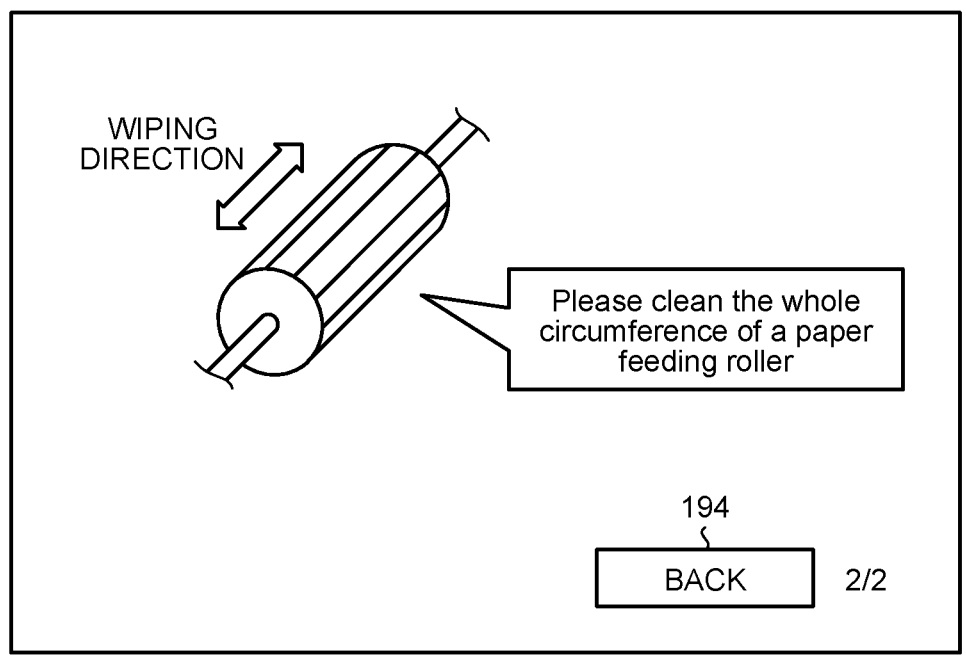
FIG. 6 is a diagram showing the example of the service information output from the output unit according to the first embodiment.

FIGS. 4 to 6 are diagrams showing an example of service information output from the output unit 185 according to the first embodiment in a case where a service is cleaning of a paper feeding roller. FIG. 4 illustrates an initial screen for explaining how to clean the paper feeding roller, and explains the location of the paper feeding roller to be cleaned. FIG. 5 illustrates a screen to which the transition is made by selection of a "Procedure" button 191 on the initial screen shown in FIG. 4, and explains what to use to clean the paper feeding roller to be cleaned. Incidentally, if a "Back" button 193 has been selected on the screen shown in FIG. 5, the transition to the initial screen shown in FIG. 4 is made. FIG. 6 illustrates a screen to which the transition is made by selection of a "Next Page" button 192 on the screen shown in FIG. 5, and explains how to clean the paper feeding roller to be cleaned. Incidentally, if a "Back" button 194 has been selected on the screen shown in FIG. 6, the transition to the screen shown in FIG. 5 is made.

Figure 7:
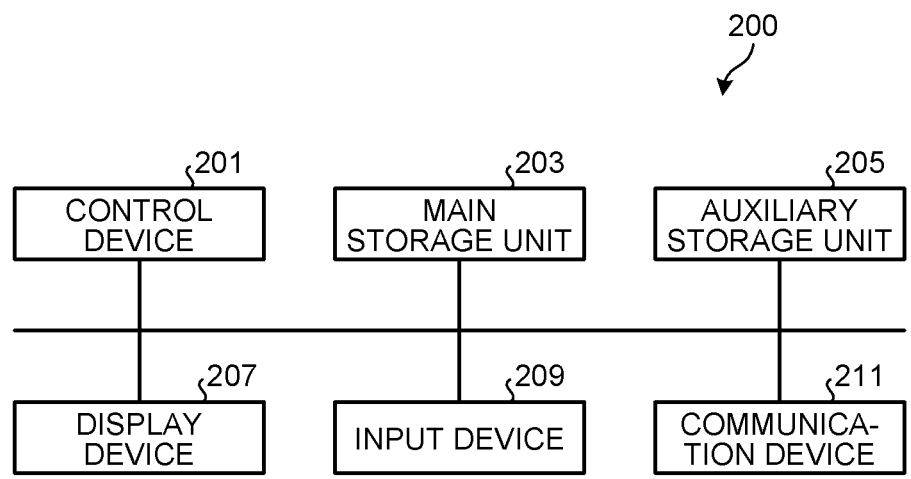
FIG. 7 is a block diagram showing an example of a hardware configuration of a center system according to the first embodiment.

FIG. 7 is a block diagram showing an example of a hardware configuration of the center system 200 according to the first embodiment. As shown in FIG. 7, the center system 200 includes a control device 201 such as a CPU or a graphics processing unit (GPU), a main storage unit 203 such as a ROM or a RAM, an auxiliary storage unit 205 such as an HDD or a solid state drive (SSD), a display device 207 such as a display, an input device 209 such as a mouse and keyboard or a touch panel, and a communication device 211 that is a communication interface, and has a hardware configuration using an average computer. Incidentally, the auxiliary storage unit 205, the display device 207, the input device 209, and the communication device 211 each can be either a built-in component or an external component.

Figure 8:
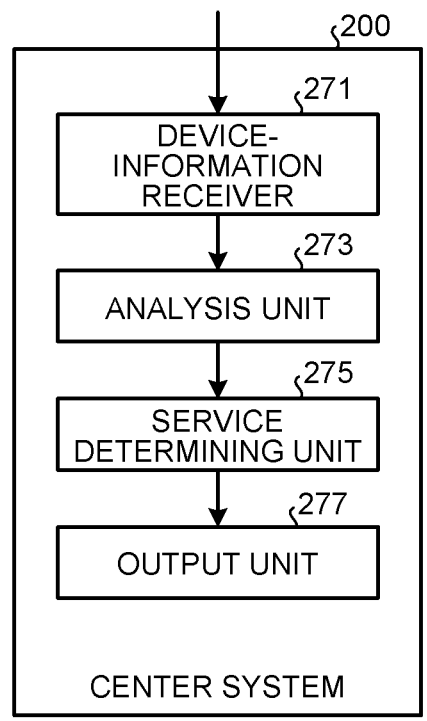
FIG. 8 is a block diagram showing an example of a functional configuration of the center system according to the first embodiment.

FIG. 8 is a block diagram showing an example of a functional configuration of the center system 200 according to the first embodiment. As shown in FIG. 8, the center system 200 includes a device-information receiver 271 (an example of a first device-information receiver), an analysis unit 273 (an example of a first analysis unit), a service determining unit 275 (an example of a first service determining unit), and an output unit 277 (an example of a first output unit).

The device-information receiver 271 can be realized by, for example, the control device 201, the main storage unit 203, and the communication device 211. The analysis unit 273, the service determining unit 275, and the output unit 277 can be realized by, for example, the control device 201 and the main storage unit 203.

The device-information receiver 271 receives device information of a device 100 from the device 100. Specifically, if the center system 200 has been determined as an analyzer by a device 100, the device-information receiver 271 receives device information of the device 100 from the device 100.

The content of processing by the analysis unit 273 is the same as that of the analysis unit 179 of the device 100. However, the center system 200 also collects device information of other devices other than the device 100; therefore, the analysis unit 273 can perform an analysis using device information of other devices other than the device 100. Furthermore, the analysis unit 273 can be configured to learn past analysis results and update the analysis logic. The content of processing by the service determining unit 275 is the same as that of the service determining unit 181 of the device 100.

The output unit 277 outputs service information on a service determined by the service determining unit 275. Specifically, the output unit 277 outputs the service name etc. of a service determined by the service determining unit 275 to the display device 207. An operator of the center system 200 checks the service name output, and, if necessary, contacts a user or customer engineer to make the user or customer engineer perform maintenance corresponding to the service name.

Figure 9:
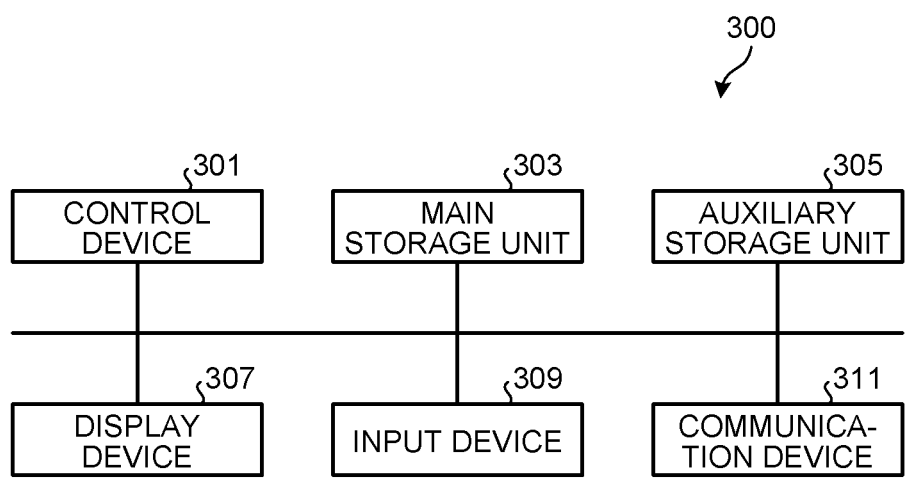
FIG. 9 is a block diagram showing an example of a hardware configuration of a user terminal according to the first embodiment.

FIG. 9 is a block diagram showing an example of a hardware configuration of any user terminal 300 according to the first embodiment. As shown in FIG. 9, the user terminal 300 includes a control device 301 such as a CPU or a GPU, a main storage unit 303 such as a ROM or a RAM, an auxiliary storage unit 305 such as an HDD or an SSD, a display device 307 such as a display, an input device 309 such as a mouse and keyboard or a touch panel, and a communication device 311 that is a communication interface, and has a hardware configuration using an average computer. Incidentally, the auxiliary storage unit 305, the display device 307, the input device 309, and the communication device 311 each can be either a built-in component or an external component.

Figure 10:
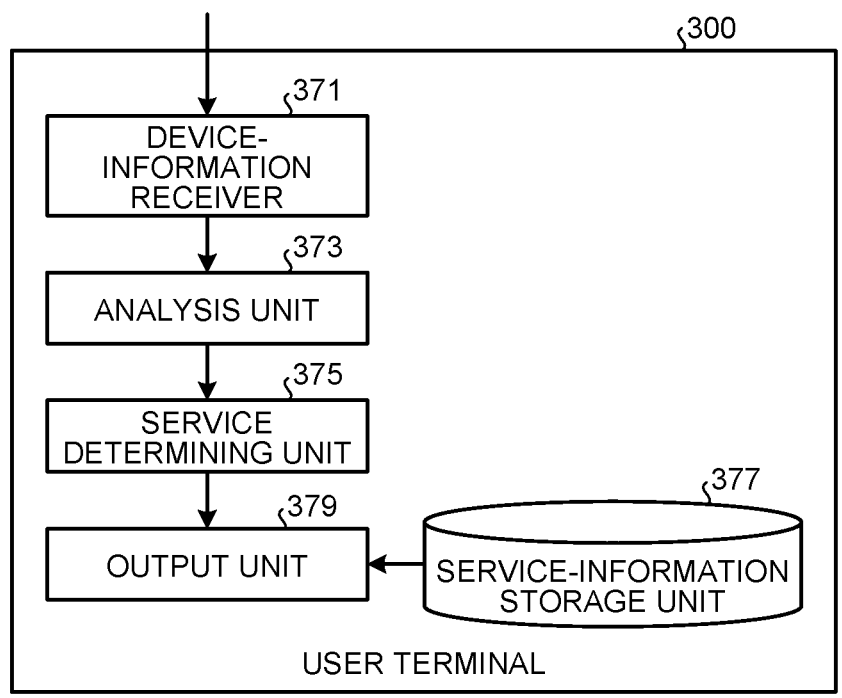
FIG. 10 is a block diagram showing an example of a functional configuration of the user terminal according to the first embodiment.

FIG. 10 is a block diagram showing an example of a functional configuration of any user terminal 300 according to the first embodiment. As shown in FIG. 10, the user terminal 300 includes a device-information receiver 371 (an example of a second device-information receiver), an analysis unit 373 (an example of a second analysis unit), a service determining unit 375 (an example of a second service determining unit), a service-information storage unit 377, and an output unit 379 (an example of a second output unit).

The device-information receiver 371 can be realized by, for example, the control device 301, the main storage unit 303, and the communication device 311. The analysis unit 373, the service determining unit 375, and the output unit 379 can be realized by, for example, the control device 301 and the main storage unit 303. The service-information storage unit 377 can be realized by, for example, the auxiliary storage unit 305.

The device-information receiver 371 receives device information of a device 100 from the device 100. Specifically, if the user terminal 300 has been determined as an analyzer by a device 100, the device-information receiver 371 receives device information of the device 100 from the device 100.

The content of processing by the analysis unit 373 is the same as that of the analysis unit 179 of the device 100. The content of processing by the service determining unit 375 is the same as that of the service determining unit 181 of the device 100.

The service-information storage unit 377 is the same as the service-information storage unit 183 of the device 100, except that the content of a service indicated in service information stored in the service-information storage unit 377 is appropriate for people who refer to the service information through the user terminal 300.

Specifically, people who refer to service information using a user terminal 300 in order to maintain a device 100 are thought to be users of the device 100; therefore, service information stored in the service-information storage unit 377 is intended for users of the device 100. Accordingly, service information stored in the service-information storage unit 377 of the user terminal 300, which is intended for users, explains the content of maintenance at a level intended for "low" if people who refer to service information are classified into three groups of high, average, and low according to their knowledge of maintenance on the device 100.

The output unit 379 outputs service information on a service determined by the service determining unit 375. Specifically, the output unit 379 acquires service information of a service determined by the service determining unit 375 from the service-information storage unit 377, and outputs the acquired service information to the display device 307. Accordingly, the output unit 379 outputs the service information appropriate for users.

Figure 11:
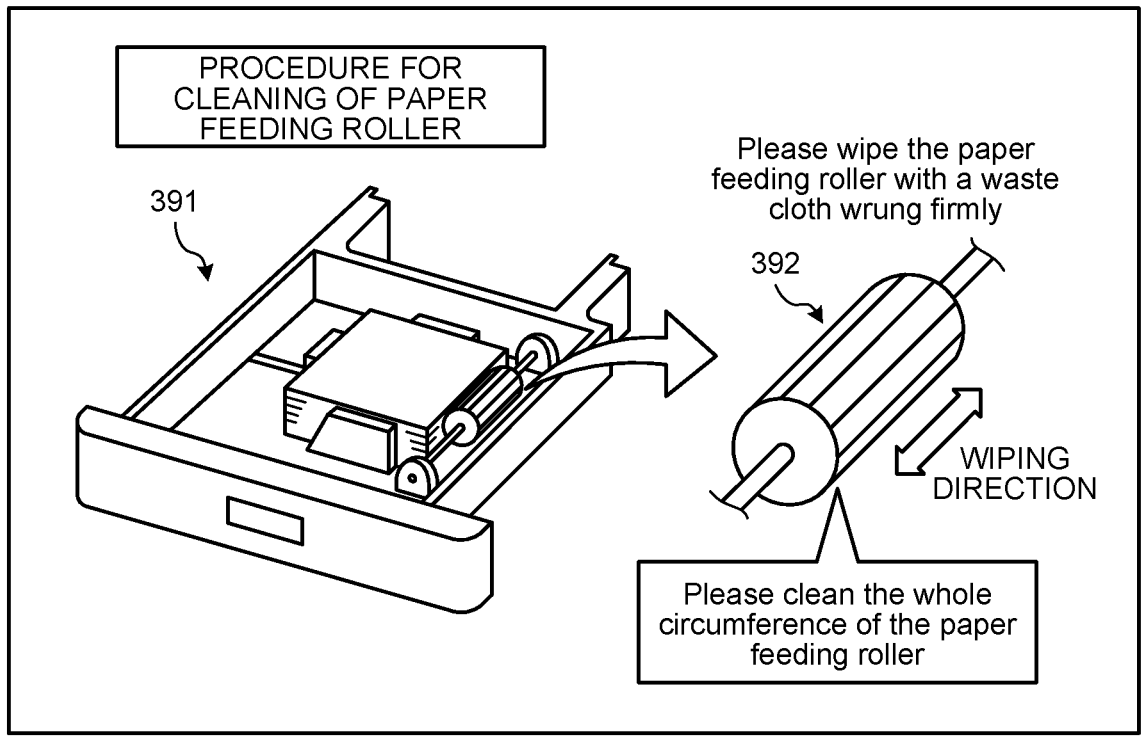
FIG. 11 is a diagram showing an example of service information output from an output unit according to the first embodiment.

FIG. 11 is a diagram showing an example of service information output from the output unit 379 according to the first embodiment in a case where a service is cleaning of a paper feeding roller. First, an initial screen is the same as that shown in FIG. 4. FIG. 11 illustrates a screen to which the transition is made by selection of the "Procedure" button 191 on the initial screen shown in FIG. 4, and explains what to use and how to clean the paper feeding roller to be cleaned. Incidentally, in the example shown in FIG. 11, the service information is intended for users assumed to have poor knowledge of maintenance on the device 100; therefore, a picture of a paper feed tray 391 is displayed, or how to clean a paper feeding roller 392 is displayed by means of a video or animation. Furthermore, the example shown in FIG. 11 assumes the display of service information on a large screen, so what to use and how to clean the paper feeding roller to be cleaned is explained on one screen; however, in the case of a small screen such as in a smartphone, the content of explanation shown in FIG. 11 can be divided into two screens like those shown in FIGS. 5 and 6.

Figure 12:
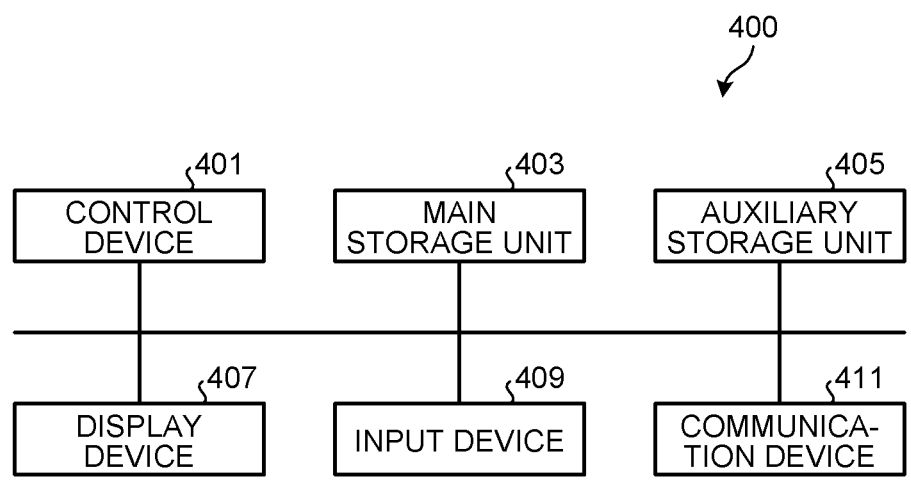
FIG. 12 is a block diagram showing an example of a hardware configuration of a staff terminal according to the first embodiment.

FIG. 12 is a block diagram showing an example of a hardware configuration of any staff terminal 400 according to the first embodiment. As shown in FIG. 12, the staff terminal 400 includes a control device 401 such as a CPU or a GPU, a main storage unit 403 such as a ROM or a RAM, an auxiliary storage unit 405 such as an HDD or an SSD, a display device 407 such as a display, an input device 409 such as a mouse and keyboard or a touch panel, and a communication device 411 that is a communication interface, and has a hardware configuration using an average computer. Incidentally, the auxiliary storage unit 405, the display device 407, the input device 409, and the communication device 411 each can be either a built-in component or an external component.

Figure 13:
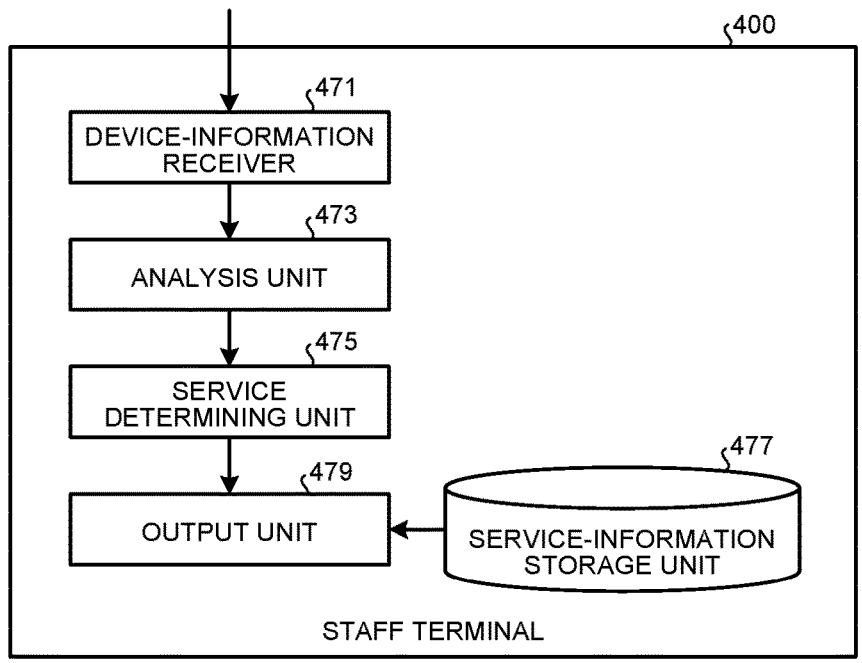
FIG. 13 is a block diagram showing an example of a functional configuration of the staff terminal according to the first embodiment.

FIG. 13 is a block diagram showing an example of a functional configuration of any staff terminal 400 according to the first embodiment. As shown in FIG. 13, the staff terminal 400 includes a device-information receiver 471 (an example of a third device-information receiver), an analysis unit 473 (an example of a third analysis unit), a service determining unit 475 (an example of a third service determining unit), a service-information storage unit 477, and an output unit 479 (an example of a third output unit).

The device-information receiver 471 can be realized by, for example, the control device 401, the main storage unit 403, and the communication device 411. The analysis unit 473, the service determining unit 475, and the output unit 479 can be realized by, for example, the control device 401 and the main storage unit 403. The service-information storage unit 477 can be realized by, for example, the auxiliary storage unit 405.

The device-information receiver 471 receives device information of a device 100 from the device 100. Specifically, if the staff terminal 400 has been determined as an analyzer by a device 100, the device-information receiver 471 receives device information of the device 100 from the device 100.

The content of processing by the analysis unit 473 is the same as that of the analysis unit 179 of the device 100. The content of processing by the service determining unit 475 is the same as that of the service determining unit 181 of the device 100.

The service-information storage unit 477 is the same as the service-information storage unit 183 of the device 100, except that the content of a service indicated in service information stored in the service-information storage unit 477 is appropriate for people who refer to the service information through the staff terminal 400.

Specifically, people who refer to service information using a staff terminal 400 in order to maintain a device 100 are thought to be customer engineers of the device 100; therefore, service information stored in the service-information storage unit 477 is intended for customer engineers of the device 100. Accordingly, service information stored in the service-information storage unit 477 of the staff terminal 400, which is intended for customer engineers, explains the content of maintenance at a level intended for "high" if people who refer to service information are classified into three groups of high, average, and low according to their knowledge of maintenance on the device 100.

The output unit 479 outputs service information on a service determined by the service determining unit 475. Specifically, the output unit 479 acquires service information of a service determined by the service determining unit 475 from the service-information storage unit 477, and outputs the acquired service information to the display device 407. Accordingly, the output unit 479 outputs the service information appropriate for customer engineers.

Figure 14:
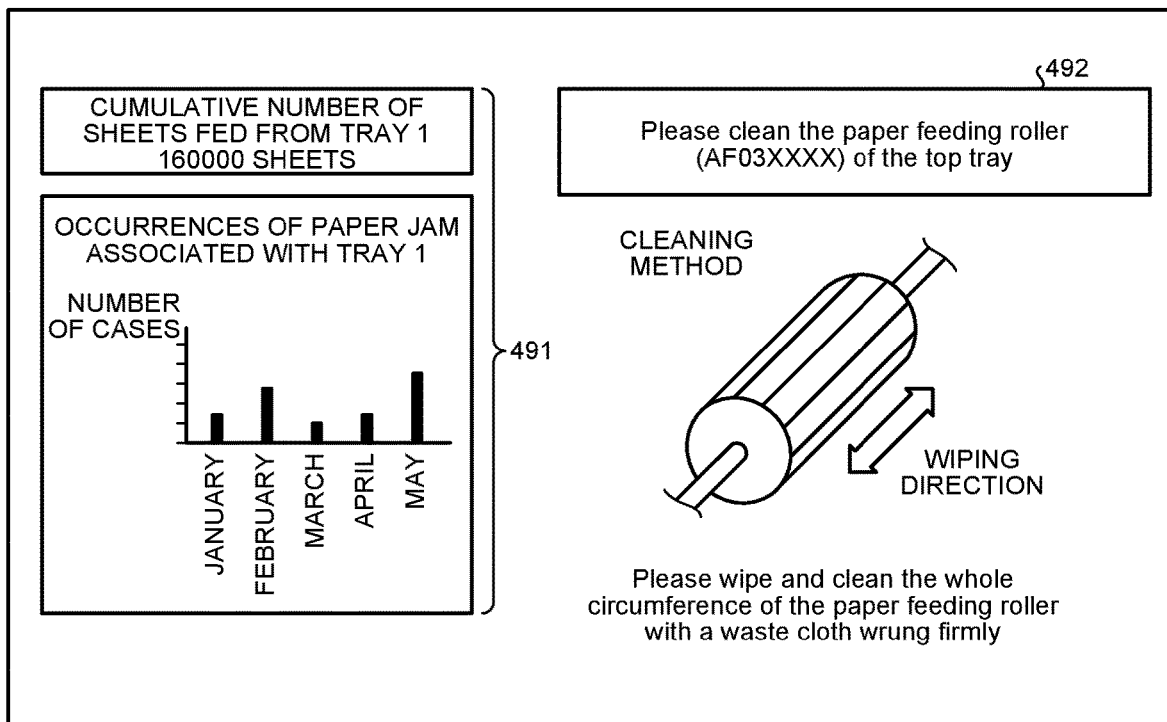
FIG. 14 is a diagram showing an example of service information output from an output unit according to the first embodiment.

FIG. 14 is a diagram showing an example of service information output from the output unit 479 according to the first embodiment in a case where a service is cleaning of a paper feeding roller. FIG. 14 illustrates a screen for explaining how to clean a paper feeding roller, and explains what to use and how to clean the paper feeding roller to be cleaned. Incidentally, in the example shown in FIG. 14, the service information is intended for customer engineers assumed to have expert knowledge of maintenance on the device 100; therefore, explanation of the installation location of the paper feeding roller to be cleaned is omitted. Furthermore, in the example shown in FIG. 14, for the purpose of letting a customer engineer consider the need for maintenance other than the cleaning of the paper feeding roller as well, the cumulative number of sheets fed and the occurrences of paper jam are displayed as relevant information 491 related to paper jam that occurred in the paper feeding roller to be cleaned, and a part number 492 of the paper feeding roller to be cleaned is displayed. Incidentally, the relevant information 491 and the part number 492 can be displayed by the use of device information used in the analysis performed by the analysis unit 473.

Figure 15:
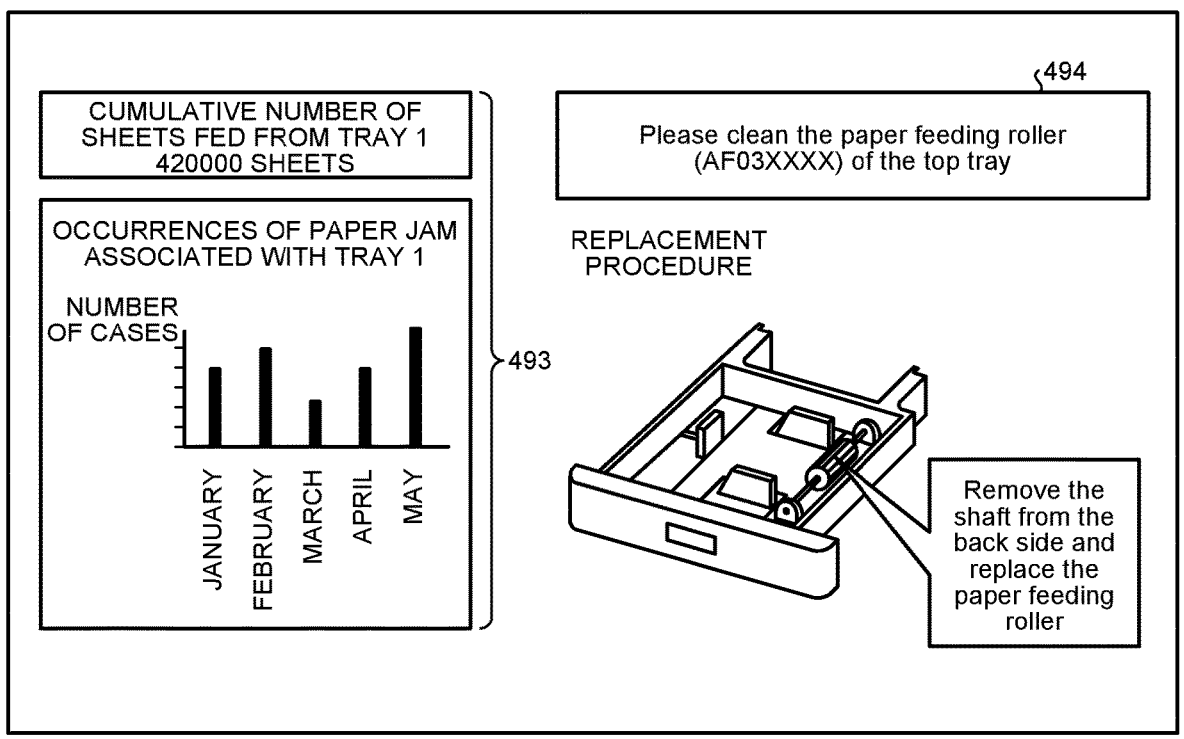
FIG. 15 is a diagram showing another example of service information output from the output unit according to the first embodiment.

FIG. 15 is a diagram showing an example of service information output from the output unit 479 according to the first embodiment in a case where a service is replacement of a paper feeding roller. FIG. 15 illustrates a screen for explaining a method for replacement of a paper feeding roller, and explains how to replace the paper feeding roller to be replaced. Furthermore, in the example shown in FIG. 15, for the purpose of letting a customer engineer consider the need for maintenance other than the replacement of the paper feeding roller as well, the cumulative number of sheets fed and the occurrences of paper jam are displayed as relevant information 493 related to paper jam that occurred in the paper feeding roller to be replaced, and a part number 494 of the paper feeding roller to be replaced is displayed. Incidentally, the relevant information 493 and the part number 494 can be displayed by the use of device information used in the analysis performed by the analysis unit 473.

Figure 16:
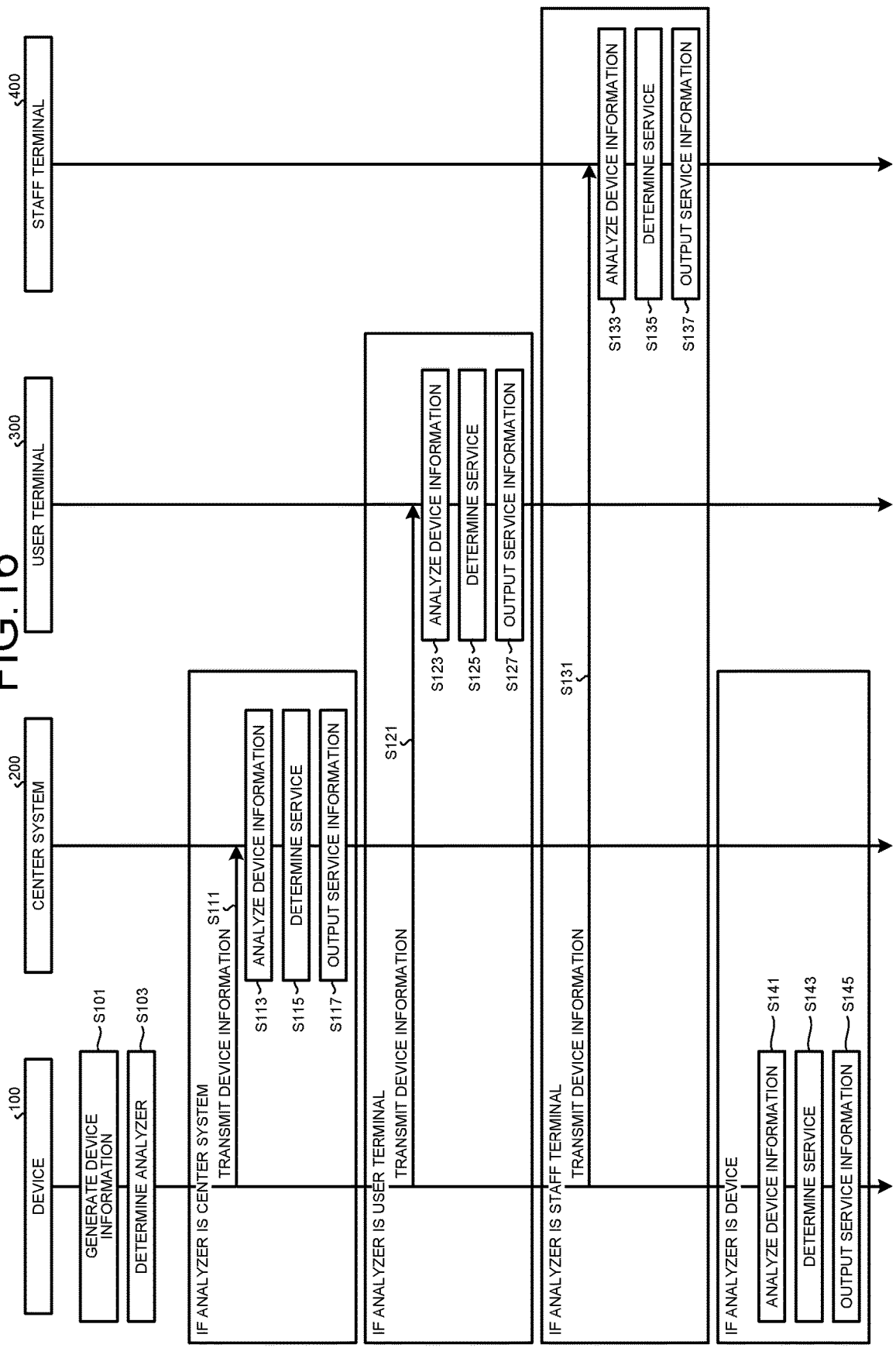
FIG. 16 is a sequence diagram showing an example of a process performed in the system according to the first embodiment.

FIG. 16 is a sequence diagram showing an example of a process performed in the system 1 according to the first embodiment.

First, the device-information generator 171 monitors a device 100 and generates device information of the device 100 (Step S101).

Then, the analyzer determining unit 175 determines an analyzer of the device information generated by the device-information generator 171 on the basis of analyzer information stored in the analyzer-information storage unit 173 (Step S103).

If the determined analyzer is the center system 200, the device-information transmitter 177 transmits the device information generated by the device-information generator 171 to the center system 200, and the device-information receiver 271 receives the device information of the device 100 from the device 100 (Step S111).

Then, the analysis unit 273 performs an analysis based on the device information received by the device-information receiver 271 (Step S113).

Then, the service determining unit 275 determines a service to the device 100 on the basis of a result of the analysis performed by the analysis unit 273 (Step S115).

And then, the output unit 277 outputs service information such as the service name of the service determined by the service determining unit 275 to the display device 207 (Step S117).

At Step S103, if the determined analyzer is a user terminal 300, the device-information transmitter 177 transmits the device information generated by the device-information generator 171 to the user terminal 300, and the device-information receiver 371 receives the device information of the device 100 from the device 100 (Step S121).

Then, the analysis unit 373 performs an analysis based on the device information received by the device-information receiver 371 (Step S123).

Then, the service determining unit 375 determines a service to the device 100 on the basis of a result of the analysis performed by the analysis unit 373 (Step S125).

And then, the output unit 379 acquires service information of the service determined by the service determining unit 375 from the service-information storage unit 377, and outputs the acquired service information to the display device 307 (Step S127).

At Step S103, if the determined analyzer is a staff terminal 400, the device-information transmitter 177 transmits the device information generated by the device-information generator 171 to the staff terminal 400, and the device-information receiver 471 receives the device information of the device 100 from the device 100 (Step S131).

Then, the analysis unit 473 performs an analysis based on the device information received by the device-information receiver 471 (Step S133).

Then, the service determining unit 475 determines a service to the device 100 on the basis of a result of the analysis performed by the analysis unit 473 (Step S135).

And then, the output unit 479 acquires service information of the service determined by the service determining unit 475 from the service-information storage unit 477, and outputs the acquired service information to the display device 407 (Step S137).

At Step S103, if the determined analyzer is the device 100, the analysis unit 179 performs an analysis based on the device information generated by the device-information generator 171 (Step S141).

Then, the service determining unit 181 determines a service to the device 100 on the basis of a result of the analysis performed by the analysis unit 179 (Step S143).

And then, the output unit 185 acquires service information of the service determined by the service determining unit 181 from the service-information storage unit 183, and outputs the acquired service information to the operation display unit 120 (Step S145).

As described above, according to the first embodiment, an entity that performs the analysis of device information of a device 100 and the determination of a service to the device 100 can be set on any of the device 100, the center system 200, a user terminal 300, and a staff terminal 400; therefore, it is possible to meet a wide range of demands from users, maintenance staff, etc.

For example, if a user demands to not transmit device information of a device 100 to the outside or demands application in a local environment having no connection to the network 2 as well, it is only necessary to set the device 100 as an entity that performs the analysis of device information and the determination of a service.

Furthermore, for example, if a user demands simplification of the configuration of a device 100, it is only necessary to set any other than the device 100 as an entity that performs the analysis of device information and the determination of a service.

Moreover, for example, if a user demands optimum maintenance support, it is only necessary to set the center system 200 as an entity that performs the analysis of device information and the determination of a service. This is because an operator of the center system 200 can draw up an optimum maintenance plan on the basis of the output service name. For example, in the case of maintenance requiring a prompt action, the operator of the center system 200 can contact a user or a customer engineer to let him/her immediately perform the maintenance, or can assign a customer engineer who can take action for the maintenance; in the case of maintenance requiring a high level of skill, the operator of the center system 200 can assign a customer engineer having the skill required; in the case of maintenance of low importance, the operator of the center system 200 can plan to perform the maintenance at the time when periodic maintenance or other emergency maintenance is performed together.

Furthermore, for example, if a user or customer engineer demands sophistication of the analysis of device information, it is only necessary to set the center system 200 as an entity that performs the analysis of device information and the determination of a service. This is because the center system 200 collects device information of devices other than the device 100 as well, and therefore can perform analysis using the device information of the devices other than the device 100.

Moreover, for example, if a user demands to confirm necessary maintenance by him/herself early, it is only necessary to set a user terminal 300 as an entity that performs the analysis of device information and the determination of a service.

Furthermore, for example, if a customer engineer demands to confirm necessary maintenance by him/herself early, it is only necessary to set a staff terminal 400 as an entity that performs the analysis of device information and the determination of a service.

Moreover, for example, if a user or customer engineer demands to analyze the device information according to the latest analysis logic, it is only necessary to set any other than the device 100 as an entity that performs the analysis of device information and the determination of a service. This is because the center system 200, any user terminal 300, and any staff terminal 400 are a general computer and can easily update (upgrade) the analysis logic.

Second Embodiment

In a second embodiment, there is described an example in which an output destination of service information of a determined service is determined according to the content of the service. In the following description, points of difference from the first embodiment are mainly described; a component having the same function as that in the first embodiment is assigned the same name and reference numeral as in the first embodiment, and description of the component is omitted.

Figures 17, 18:
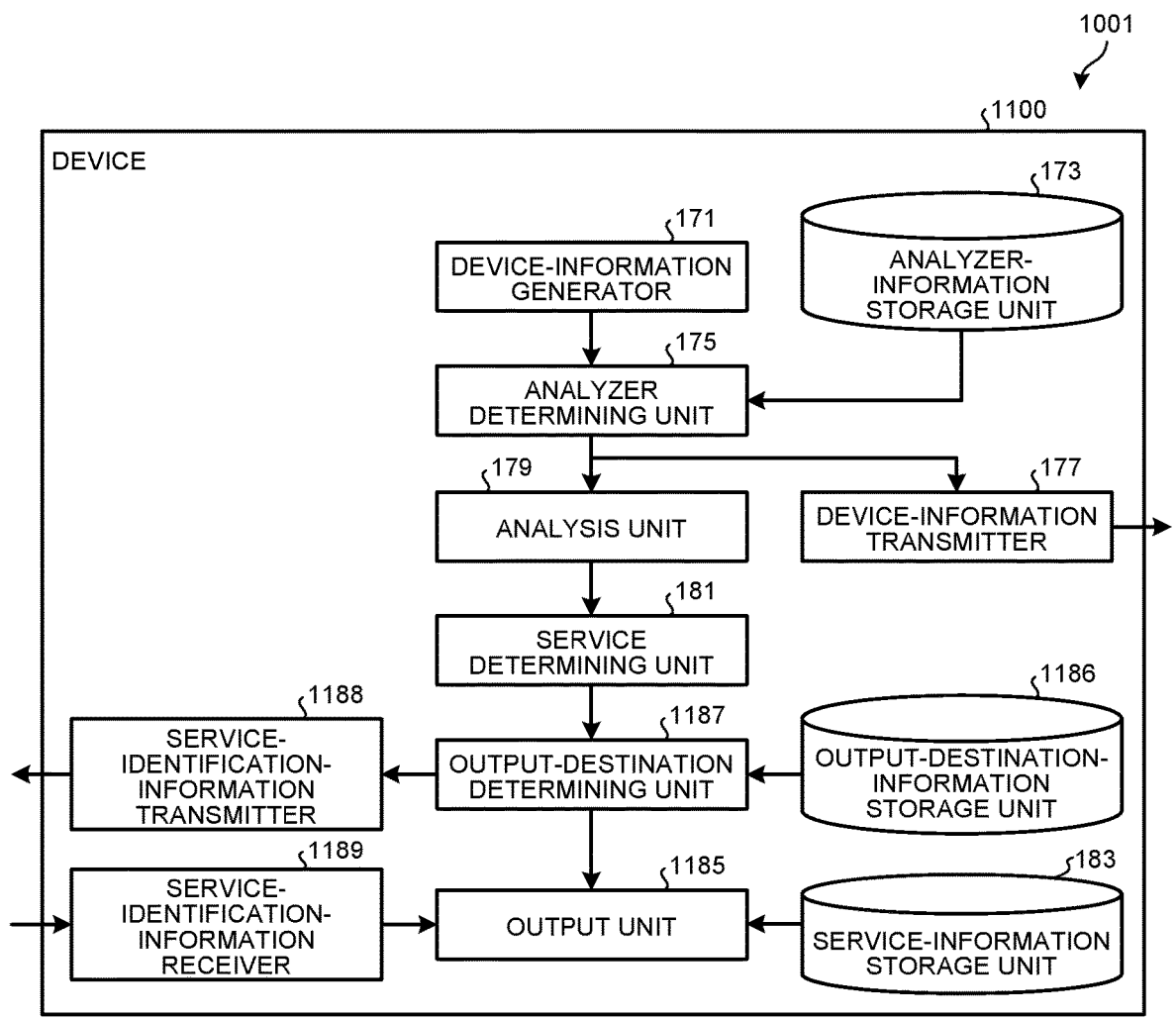
FIG. 17 is a block diagram showing an example of a functional configuration of a device of a system according to a second embodiment.
FIG. 18 is a diagram showing an example of output destination information stored in an output-destination-information storage unit according to the second embodiment.

FIG. 17 is a block diagram showing an example of a functional configuration of any device 1100 of a system 1001 according to the second embodiment. As shown in FIG. 17, the device 1100 differs from the device 100 according to the first embodiment in that the device 1100 includes an output unit 1185 instead of the output unit 185 and further includes an output-destination-information storage unit 1186, an output-destination determining unit 1187 (an example of a second output-destination determining unit), a service-identification-information transmitter 1188 (an example of a second service-identification-information transmitter), and a service-identification-information receiver 1189 (an example of a third service-identification-information receiver).

The output-destination-information storage unit 1186 can be realized by, for example, the MEM-P 112. The output-destination determining unit 1187 can be realized by, for example, the CPU 111 and the MEM-P 112. The service-identification-information transmitter 1188 and the service-identification-information receiver 1189 can be realized by, for example, the CPU 111, the MEM-P 112, and the network I/F 130.

The output-destination-information storage unit 1186 stores therein output destination information in which service identification information identifying a service is associated with output-destination identification information identifying an output destination. In the second embodiment, output-destination identification information included in output destination information stored in the output-destination-information storage unit 1186 shall indicate any of the device 1100, a user terminal 1300, and a staff terminal 1400; however, candidates for the output destination are not limited to these.

In the second embodiment, there is described an example in which output destination information is constructed on the basis of a design concept that maintenance with a high degree of difficulty is associated with a staff terminal 1400, and maintenance with a not-high degree of difficulty is associated with the device 1100 or a user terminal 1300; however, output destination information is not limited to this concept.

FIG. 18 is a diagram showing an example of output destination information stored in the output-destination-information storage unit 1186 according to the second embodiment. In the example shown in FIG. 18, service identification information "0001" indicates cleaning of a paper feeding roller, and is associated with output-destination identification information that indicates a user terminal 1300. Furthermore, service identification information "0002" indicates replacement of a paper feeding roller, and is associated with output-destination identification information that indicates a staff terminal 1400.

The output-destination determining unit 1187 determines an output destination of service information on a service determined by the service determining unit 181. Specifically, the output-destination determining unit 1187 determines an output destination of service information on a service determined by the service determining unit 181 on the basis of the output destination information stored in the output-destination-information storage unit 1186.

In the second embodiment, as described above, output-destination identification information indicates any of the device 1100, a user terminal 1300, and a staff terminal 1400; therefore, the output-destination determining unit 1187 determines that the device 1100, a user terminal 1300, or a staff terminal 1400 indicated by output-destination identification information associated with service identification information of a service determined by the service determining unit 181 is an output destination of service information on the service.

If a user terminal 1300 or a staff terminal 1400 has been determined as the output destination by the output-destination determining unit 1187, the service-identification-information transmitter 1188 transmits the service identification information of the service determined by the service determining unit 181 to the determined output destination. Incidentally, in addition to the service identification information, the service-identification-information transmitter 1188 can transmit device information used in an analysis performed by the analysis unit 179 to the output destination.

The service-identification-information receiver 1189 receives service identification information identifying a service determined by a center system 1200 from the center system 1200. Specifically, if the device 1100 has been determined as an output destination of service information by the center system 1200, the service-identification-information receiver 1189 receives service identification information of a service determined by the center system 1200 from the center system 1200. Incidentally, in addition to the service identification information, the service-identification-information receiver 1189 can receive device information used in an analysis performed by the analysis unit 273 from the center system 1200.

If the device 1100 has been determined as the output destination by the output-destination determining unit 1187, the output unit 1185 outputs service information on a service determined by the service determining unit 181; if the service-identification-information receiver 1189 has received service identification information, the output unit 1185 outputs service information on a service indicated by the service identification information.

Specifically, if the device 1100 has been determined as the output destination by the output-destination determining unit 1187, the output unit 1185 acquires service information of a service determined by the service determining unit 181 from the service-information storage unit 183, and outputs the acquired service information to the operation display unit 120. If the service-identification-information receiver 1189 has received service identification information, the output unit 1185 acquires service information of a service indicated by the service identification information from the service-information storage unit 183, and outputs the acquired service information to the operation display unit 120.

Figure 19:
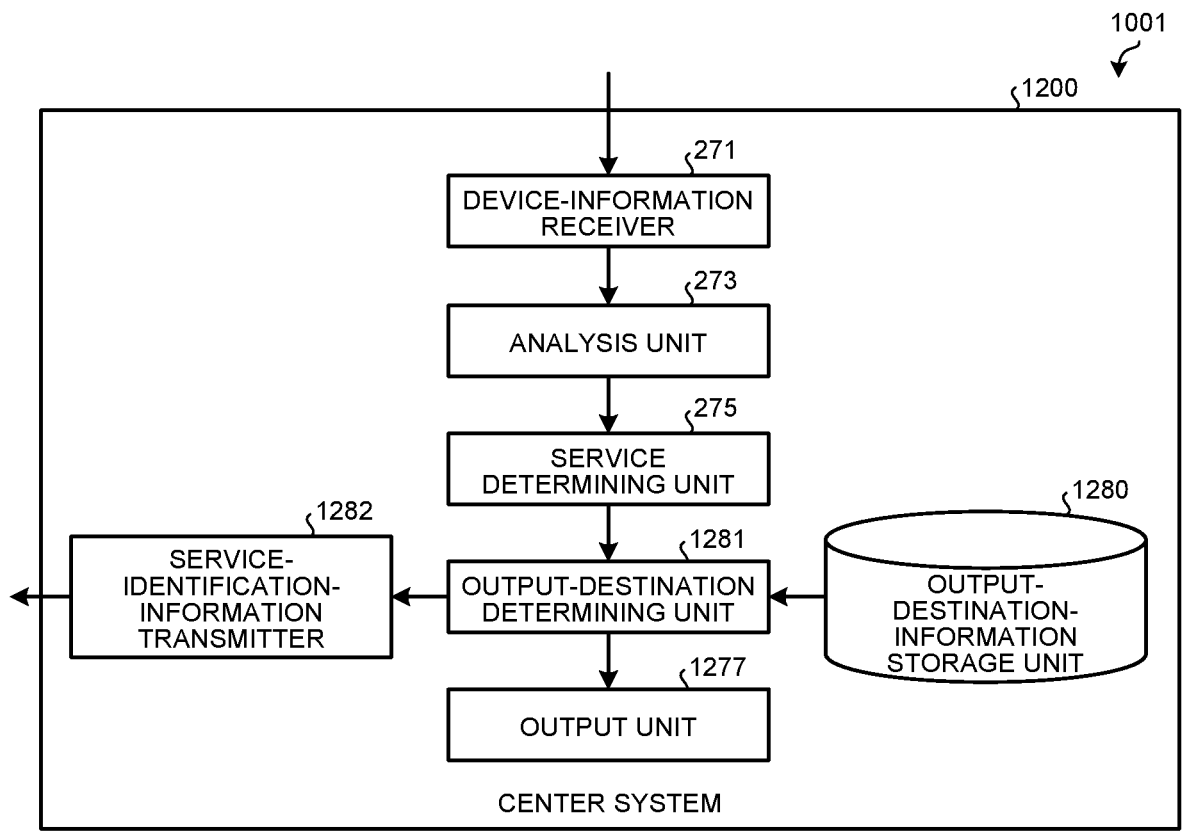
FIG. 19 is a block diagram showing an example of a functional configuration of a center system of the system according to the second embodiment.

FIG. 19 is a block diagram showing an example of a functional configuration of the center system 1200 of the system 1001 according to the second embodiment. As shown in FIG. 19, the center system 1200 differs from the center system 200 according to the first embodiment in that the center system 1200 includes an output unit 1277 instead of the output unit 277 and further includes an output-destination-information storage unit 1280, an output-destination determining unit 1281 (an example of a first output-destination determining unit), and a service-identification-information transmitter 1282 (an example of a first service-identification-information transmitter).

The output-destination-information storage unit 1280 can be realized by, for example, the auxiliary storage unit 205. The output-destination determining unit 1281 can be realized by, for example, the control device 201 and the main storage unit 203. The service-identification-information transmitter 1282 can be realized by, for example, the control device 201, the main storage unit 203, and the communication device 211.

The output-destination-information storage unit 1280 is the same as the output-destination-information storage unit 1186 of the device 1100, except that output-destination identification information included in output destination information stored in the output-destination-information storage unit 1280 indicates any of the device 1100, the center system 1200, a user terminal 1300, and a staff terminal 1400.

In the second embodiment, there is described an example in which output destination information is constructed on the basis of a design concept that maintenance with a high degree of difficulty is associated with a staff terminal 1400, maintenance with a not-high degree of difficulty is associated with the device 1100 or a user terminal 1300, and maintenance requiring a prompt action and maintenance requiring a high level of skill are associated with the center system 1200; however, output destination information is not limited to this concept.

The output-destination determining unit 1281 determines an output destination of service information on a service determined by the service determining unit 275. Specifically, the output-destination determining unit 1281 determines an output destination of service information on a service determined by the service determining unit 275 on the basis of the output destination information stored in the output-destination-information storage unit 1280.

In the second embodiment, as described above, output-destination identification information indicates any of the device 1100, the center system 1200, a user terminal 1300, and a staff terminal 1400; therefore, the output-destination determining unit 1281 determines that the device 1100, the center system 1200, a user terminal 1300, or a staff terminal 1400 indicated by output-destination identification information associated with service identification information of a service determined by the service determining unit 275 is an output destination of service information on the service.

If any of the device 1100, a user terminal 1300, and a staff terminal 1400 has been determined as the output destination by the output-destination determining unit 1281, the service-identification-information transmitter 1282 transmits the service identification information of the service determined by the service determining unit 275 to the determined output destination. Incidentally, in addition to the service identification information, the service-identification-information transmitter 1282 can transmit device information used in an analysis performed by the analysis unit 273 to the output destination.

If the center system 1200 has been determined as the output destination by the output-destination determining unit 1281, the output unit 1277 outputs the service information on the service determined by the service determining unit 275. Specifically, the output unit 1277 outputs the service name etc. of the service determined by the service determining unit 275 to the display device 207.

Figure 20:
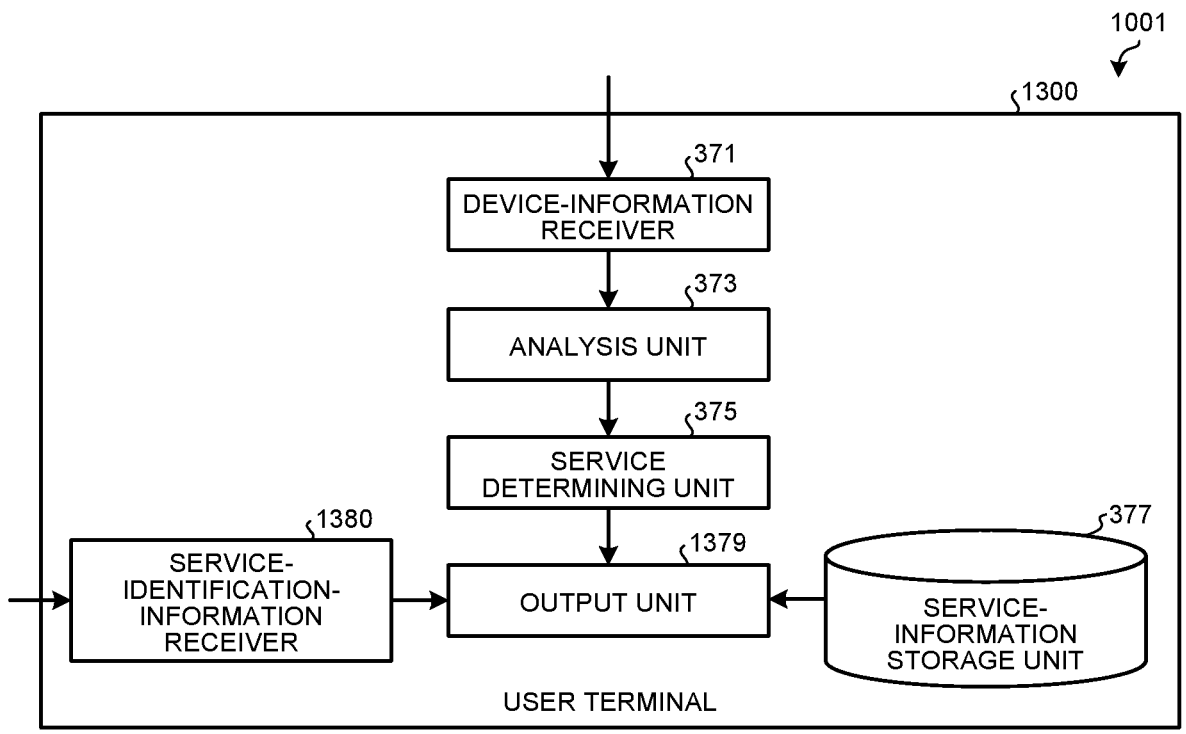
FIG. 20 is a block diagram showing an example of a functional configuration of a user terminal of the system according to the second embodiment.

FIG. 20 is a block diagram showing an example of a functional configuration of any user terminal 1300 of the system 1001 according to the second embodiment. As shown in FIG. 20, the user terminal 1300 differs from the user terminal 300 according to the first embodiment in that the user terminal 1300 includes an output unit 1379 instead of the output unit 379 and further includes a service-identification-information receiver 1380 (an example of a first service-identification-information receiver). The service-identification-information receiver 1380 can be realized by, for example, the control device 301, the main storage unit 303, and the communication device 311.

The service-identification-information receiver 1380 receives service identification information identifying a service determined by the device 1100 or the center system 1200 from the device 1100 or the center system 1200.

Specifically, if a user terminal 1300 has been determined as an output destination of service information by the device 1100, the service-identification-information receiver 1380 receives service identification information of a service determined by the device 1100 from the device 1100. Incidentally, in addition to the service identification information, the service-identification-information receiver 1380 can receive device information used in an analysis performed by the analysis unit 179 from the device 1100.

Likewise, if a user terminal 1300 has been determined as an output destination of service information by the center system 1200, the service-identification-information receiver 1380 receives service identification information of a service determined by the center system 1200 from the center system 1200. Incidentally, in addition to the service identification information, the service-identification-information receiver 1380 can receive device information used in an analysis performed by the analysis unit 273 from the center system 1200.

The output unit 1379 outputs service information on a service determined by the service determining unit 375; furthermore, if the service-identification-information receiver 1380 has received service identification information, the output unit 1379 outputs service information on a service indicated by the service identification information.

Specifically, the output unit 1379 acquires service information of a service determined by the service determining unit 375 from the service-information storage unit 377, and outputs the acquired service information to the display device 307. Furthermore, if the service-identification-information receiver 1380 has received service identification information, the output unit 1379 acquires service information of a service indicated by the service identification information from the service-information storage unit 377, and outputs the acquired service information to the display device 307.

Figure 21:
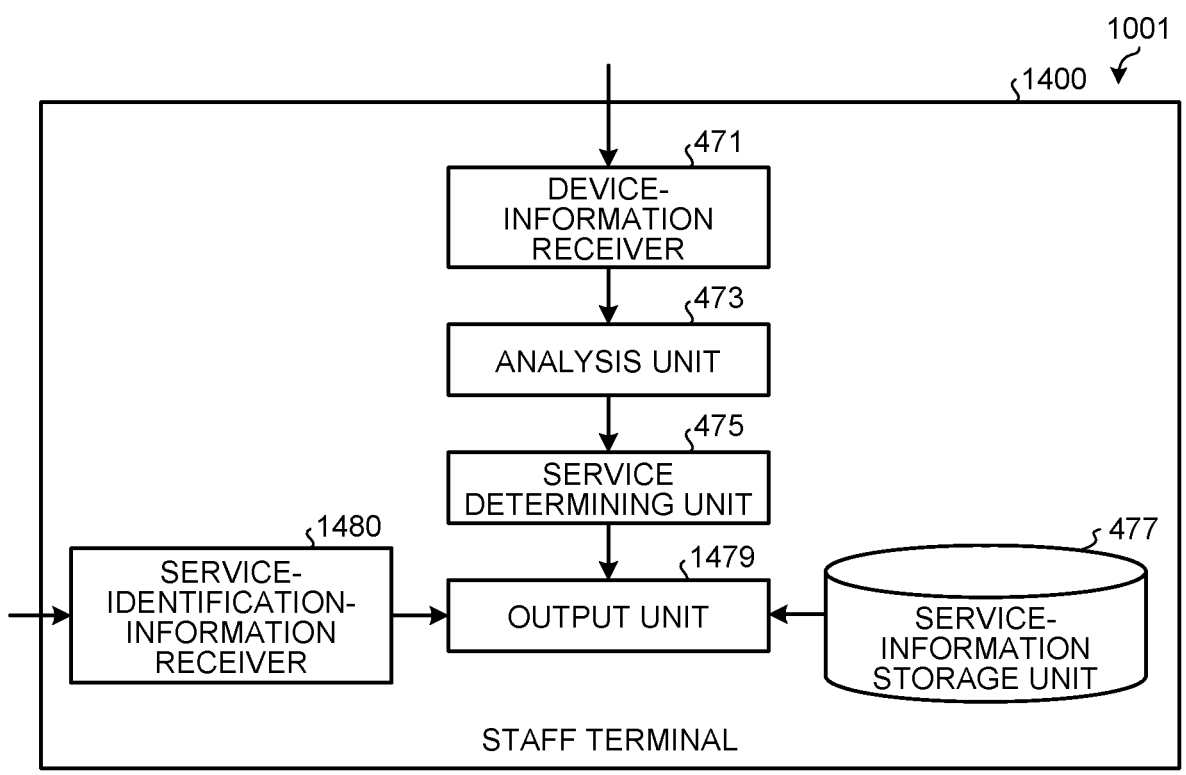
FIG. 21 is a block diagram showing an example of a functional configuration of a staff terminal of the system according to the second embodiment.

FIG. 21 is a block diagram showing an example of a functional configuration of any staff terminal 1400 of the system 1001 according to the second embodiment. As shown in FIG. 21, the staff terminal 1400 differs from the staff terminal 400 according to the first embodiment in that the staff terminal 1400 includes an output unit 1479 instead of the output unit 479 and further includes a service-identification-information receiver 1480 (an example of a second service-identification-information receiver). The service-identification-information receiver 1480 can be realized by, for example, the control device 401, the main storage unit 403, and the communication device 411.

The service-identification-information receiver 1480 receives service identification information identifying a service determined by the device 1100 or the center system 1200 from the device 1100 or the center system 1200.

Specifically, if a staff terminal 1400 has been determined as an output destination of service information by the device 1100, the service-identification-information receiver 1480 receives service identification information of a service determined by the device 1100 from the device 1100. Incidentally, in addition to the service identification information, the service-identification-information receiver 1480 can receive device information used in an analysis performed by the analysis unit 179 from the device 1100.

Likewise, if a staff terminal 1400 has been determined as an output destination of service information by the center system 1200, the service-identification-information receiver 1480 receives service identification information of a service determined by the center system 1200 from the center system 1200. Incidentally, in addition to the service identification information, the service-identification-information receiver 1480 can receive device information used in an analysis performed by the analysis unit 273 from the center system 1200.

The output unit 1479 outputs service information on a service determined by the service determining unit 475; furthermore, if the service-identification-information receiver 1480 has received service identification information, the output unit 1479 outputs service information on a service indicated by the service identification information.

Specifically, the output unit 1479 acquires service information of a service determined by the service determining unit 475 from the service-information storage unit 477, and outputs the acquired service information to the display device 407. Furthermore, if the service-identification-information receiver 1480 has received service identification information, the output unit 1479 acquires service information of a service indicated by the service identification information from the service-information storage unit 477, and outputs the acquired service information to the display device 407.

Figure 22:
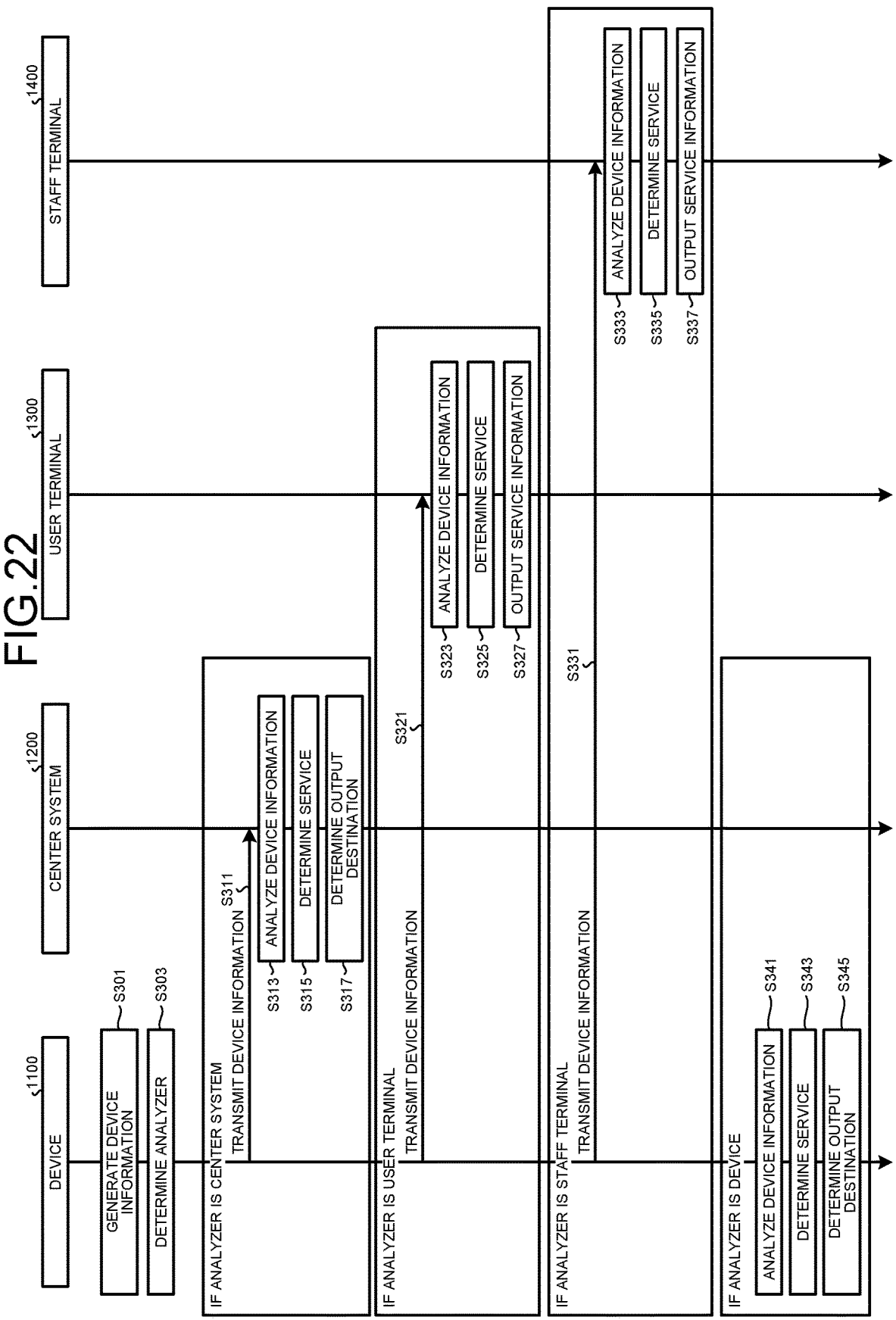
FIG. 22 is a sequence diagram showing an example of a process performed in the system according to the second embodiment.

FIG. 22 is a sequence diagram showing an example of a process performed in the system 1001 according to the second embodiment.

First, processes at Steps S301 and S303 are the same as those at Steps S101 and S103 in the sequence diagram shown in FIG. 16.

Then, processes at Steps S311 to S315 are the same as those at Steps S111 to S115 in the sequence diagram shown in FIG. 16.

And then, the output-destination determining unit 1281 determines an output destination of service information on a service determined by the service determining unit 275 on the basis of output destination information stored in the output-destination-information storage unit 1280 (Step S317). Incidentally, subsequent processes after Step S317 will be described later.

Processes at Steps S321 to S327 are the same as those at Steps S121 to S127 in the sequence diagram shown in FIG. 16.

Processes at Steps S331 to S337 are the same as those at Steps S131 to S137 in the sequence diagram shown in FIG. 16.

Processes at Steps S341 and S343 are the same as those at Steps S141 and S143 in the sequence diagram shown in FIG. 16.

Then, the output-destination determining unit 1187 determines an output destination of service information on a service determined by the service determining unit 181 on the basis of output destination information stored in the output-destination-information storage unit 1186 (Step S345). Incidentally, subsequent processes after Step S345 will be described later.

Figure 23:
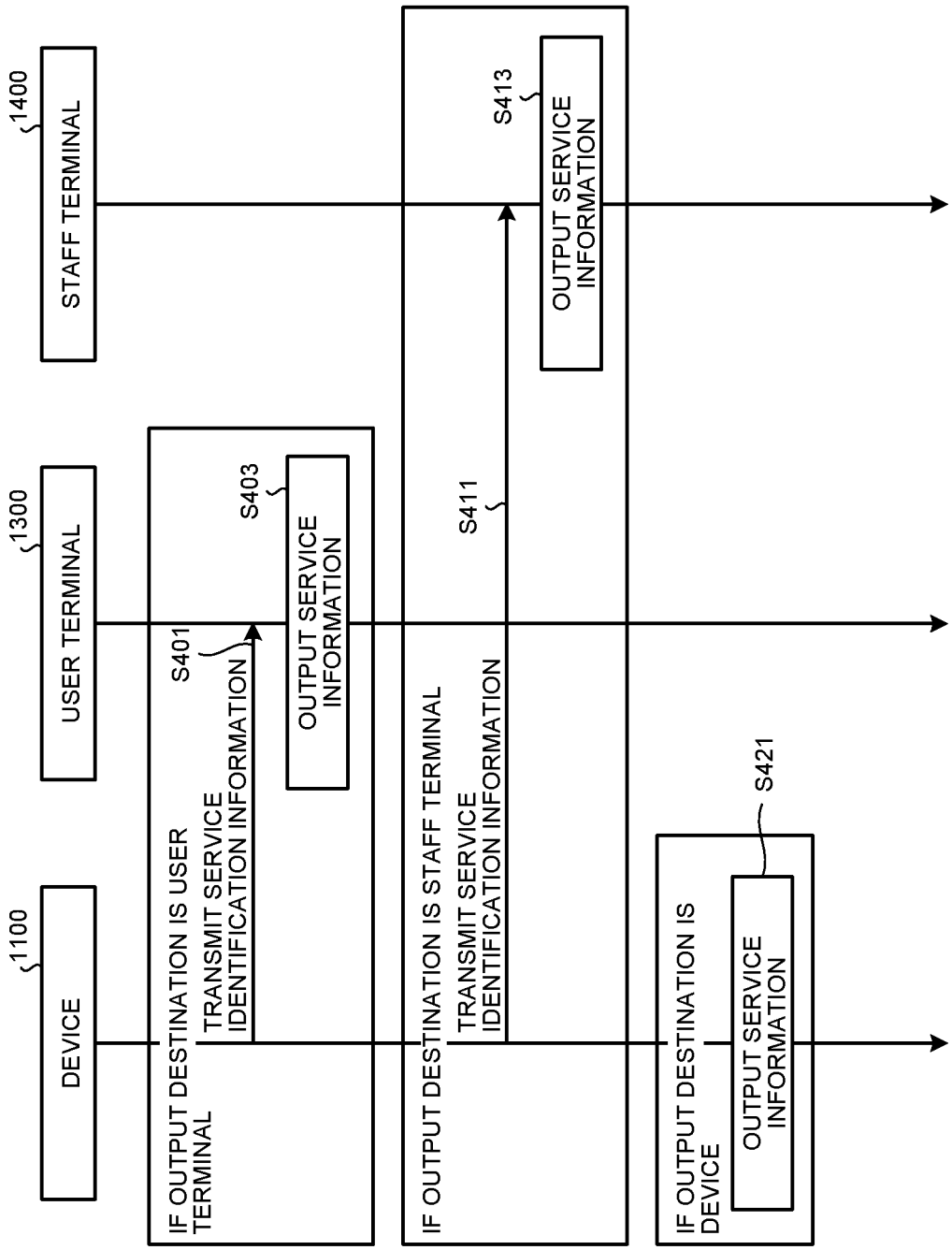
FIG. 23 is a sequence diagram showing an example of a process performed after an output destination of service information is determined at Step S345 shown in FIG. 22.

FIG. 23 is a sequence diagram showing an example of a process performed after an output destination of service information is determined at Step S345 shown in FIG. 22.

If the output destination determined at Step S345 is a user terminal 1300, the service-identification-information transmitter 1188 transmits service identification information of a service determined by the service determining unit 181 to the user terminal 1300, and the service-identification-information receiver 1380 receives the service identification information from the device 1100 (Step S401).

Then, the output unit 1379 acquires service information of a service indicated by the service identification information, which has been received by the service-identification-information receiver 1380, from the service-information storage unit 377, and outputs the acquired service information to the display device 307 (Step S403).

If the output destination determined at Step S345 is a staff terminal 1400, the service-identification-information transmitter 1188 transmits service identification information of a service determined by the service determining unit 181 to the staff terminal 1400, and the service-identification-information receiver 1480 receives the service identification information from the device 1100 (Step S411).

Then, the output unit 1479 acquires service information of a service indicated by the service identification information, which has been received by the service-identification-information receiver 1480, from the service-information storage unit 477, and outputs the acquired service information to the display device 407 (Step S413).

If the output destination determined at Step S345 is the device 1100, the output unit 1185 acquires service information of a service determined by the service determining unit 181 from the service-information storage unit 183, and outputs the acquired service information to the operation display unit 120 (Step S421).

Figure 24:
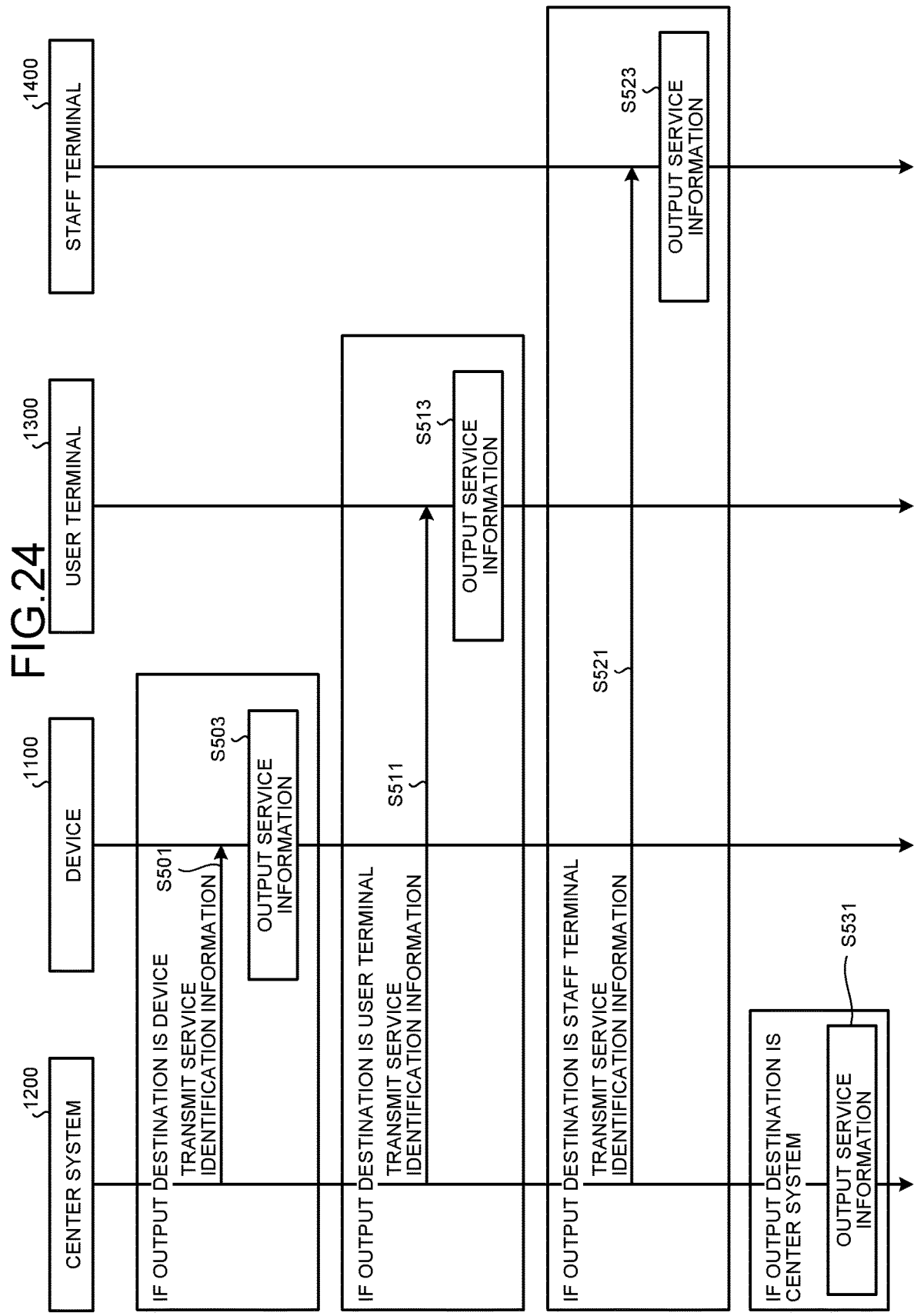
FIG. 24 is a sequence diagram showing an example of a process performed after an output destination of service information is determined at Step S317 shown in FIG. 22.

FIG. 24 is a sequence diagram showing an example of a process performed after an output destination of service information is determined at Step S317 shown in FIG. 22.

If the output destination determined at Step S317 is the device 1100, the service-identification-information transmitter 1282 transmits service identification information of a service determined by the service determining unit 275 to the device 1100, and the service-identification-information receiver 1189 receives the service identification information from the center system 1200 (Step S501).

Then, the output unit 1185 acquires service information of a service indicated by the service identification information, which has been received by the service-identification-information receiver 1189, from the service-information storage unit 183, and outputs the acquired service information to the operation display unit 120 (Step S503).

If the output destination determined at Step S317 is a user terminal 1300, the service-identification-information transmitter 1282 transmits service identification information of a service determined by the service determining unit 275 to the user terminal 1300, and the service-identification-information information receiver 1380 receives the service identification information from the center system 1200 (Step S511).

Then, the output unit 1379 acquires service information of a service indicated by the service identification information, which has been received by the service-identification-information receiver 1380, from the service-information storage unit 377, and outputs the acquired service information to the display device 307 (Step S513).

If the output destination determined at Step S317 is a staff terminal 1400, the service-identification-information transmitter 1282 transmits service identification information of a service determined by the service determining unit 275 to the staff terminal 1400, and the service-identification-information receiver 1480 receives the service identification information from the center system 1200 (Step S521).

Then, the output unit 1479 acquires service information of a service indicated by the service identification information, which has been received by the service-identification-information receiver 1480, from the service-information storage unit 477, and outputs the acquired service information to the display device 407 (Step S523).

If the output destination determined at Step S317 is the center system 1200, the output unit 1277 outputs service information such as the service name of a service determined by the service determining unit 275 to the display device 207 (Step S531).

As described above, according to the second embodiment, if a device 1100 or the center system 1200 is an entity that performs the analysis of device information and the determination of a service, an entity that outputs service information is determined according to a service determined; therefore, it is possible to inform an appropriate person to perform maintenance of the content of the maintenance.

For example, in the case of easy maintenance that a user can deal with by him/herself, a device 1100 or a user terminal 1300 is determined as an entity that outputs service information; therefore, it is possible to inform the user appropriate to perform maintenance of the content of the maintenance.

Furthermore, for example, in the case of maintenance that is difficult for a user to deal with by him/herself, a staff terminal 1400 is determined as an entity that outputs service information; therefore, it is possible to inform a customer engineer appropriate to perform maintenance of the content of the maintenance.

Moreover, for example, in the case of maintenance requiring a prompt action or maintenance requiring a high level of skill, the center system 1200 is determined as an entity that outputs service information; therefore, it is possible to contact a user or a customer engineer to let him/her immediately perform the maintenance or assign a customer engineer having the skill required.

Variation 1

In Variation 1, there is described an example in which a service is determined on the basis of user information on a user in addition to an analysis result. In the following description, points of difference from the first embodiment are mainly described; a component having the same function as that in the first embodiment is assigned the same name and reference numeral as in the first embodiment, and description of the component is omitted.

Figures 25, 26:
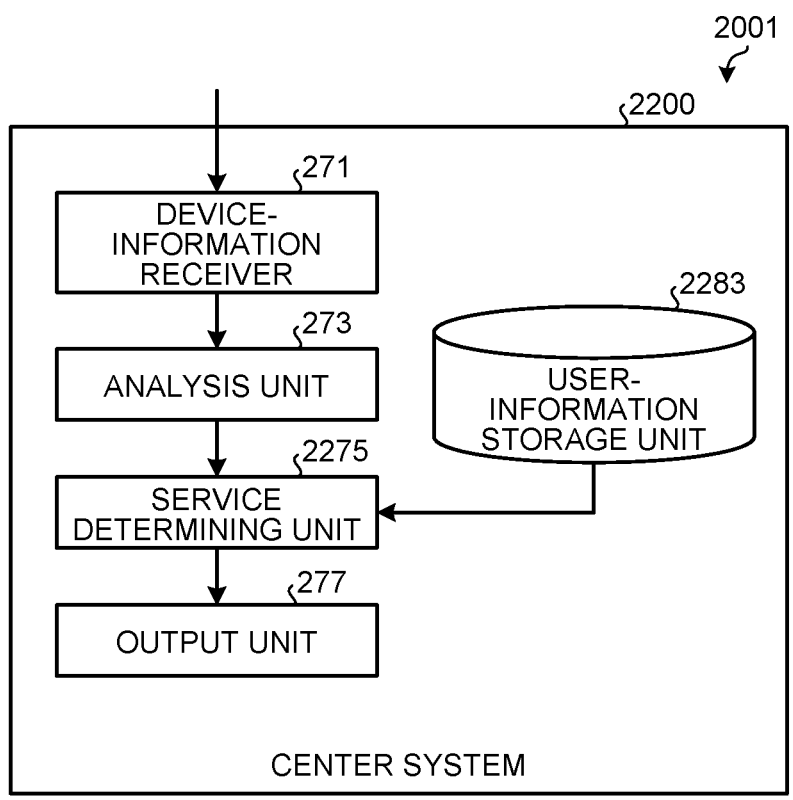
FIG. 25 is a block diagram showing an example of a functional configuration of a center system of a system according to Variation 1.
FIG. 26 is a diagram showing an example of user information according to Variation 1.

FIG. 25 is a block diagram showing an example of a functional configuration of a center system 2200 of a system 2001 according to Variation 1. As shown in FIG. 25, the center system 2200 differs from the center system 200 according to the first embodiment in that the center system 2200 includes a service determining unit 2275 instead of the service determining unit 275 and further includes a user-information storage unit 2283. The user-information storage unit 2283 can be realized by, for example, the auxiliary storage unit 205.

The user-information storage unit 2283 stores therein user information on a user. In Variation 1, the user-information storage unit 2283 stores therein user information in which user identification information identifying a user is associated with priority information indicating a priority.

In Variation 1, there is described an example in which a priority indicated in priority information is set according to the content of a maintenance contract made with a user indicated by user identification information associated with the priority information; the higher the level of maintenance required, the higher the priority. However, the priority information is not limited to this example.

FIG. 26 is a diagram showing an example of user information according to Variation 1. In the example shown in FIG. 26, user identification information "User A" is associated with priority information "1", and user identification information "User B" is associated with priority information "3". Incidentally, the lower the value of priority information, the higher the priority.

The service determining unit 2275 determines a service to a device 100 on the basis of user information in addition to an analysis result. Specifically, using user identification information included in device information received by the device-information receiver 271, the service determining unit 2275 acquires priority information associated with the user identification information, and determines a service to the device 100 on the basis of the acquired priority information and a result of analysis performed by the analysis unit 273.

For example, when the result of analysis performed by the analysis unit 273 is a slip amount as in the case of the analysis unit 179 in the first embodiment, if the slip amount is equal to or more than a first threshold and less than a second threshold (the first threshold<the second threshold), the service determining unit 2275 determines cleaning of a paper feeding roller as a maintenance service; if the slip amount is equal to or more than the second threshold, the service determining unit 2275 determines replacement of a paper feeding roller as a maintenance service.

In this case, the service determining unit 2275 changes the value of at least either the first threshold or the second threshold according to the acquired priority information. For example, with increasing value indicated in the acquired priority information (with increasing priority), the service determining unit 2275 lowers the value of at least either the first threshold or the second threshold so that the maintenance service is performed earlier than usual.

Furthermore, for example, when the result of analysis performed by the analysis unit 273 is a slip amount as in the case of the analysis unit 179 in the first embodiment, if the slip amount is equal to or more than a third threshold and the cumulative number of sheets fed included in the device information is less than a fourth threshold, the service determining unit 2275 determines cleaning of a paper feeding roller as a maintenance service; if the slip amount is equal to or more than the third threshold and the cumulative number of sheets fed included in the device information is equal to or more than the fourth threshold, the service determining unit 2275 determines replacement of a paper feeding roller as a maintenance service.

Also in this case, the service determining unit 2275 changes the value of at least either the third threshold or the fourth threshold according to the acquired priority information. For example, with increasing value indicated in the acquired priority information (with increasing priority), the service determining unit 2275 lowers the value of at least either the third threshold or the fourth threshold so that the maintenance service is performed earlier than usual.

As described above, according to Variation 1, a basis (a threshold) for determining whether a service is required can be changed according to a user (for example, the content of a maintenance contract made with a user); therefore, it is possible to provide maintenance at a level appropriate for each user.

Variation 2

In the above embodiments, the service-information storage unit 183, the service-information storage unit 377, and the service-information storage unit 477 can be set up on the outside such as a cloud, and service information can be provided as online documentation.

Program

Respective programs executed by the devices, the center system, the user terminals, and the staff terminals according to the above-described embodiments (hereinafter, referred to as "the apparatuses according to any of the embodiments") are provided in such a manner that the programs are each stored on a computer-readable recording medium, such as a CD-ROM, a CD-R, a memory card, a digital versatile disk (DVD), or a flexible disk (FD), in an installable or executable file format.

Furthermore, the respective programs executed by the apparatuses according to any of the embodiments can be provided in such a manner that the programs are each stored on a computer connected to a network such as the Internet so that the programs can be downloaded via the network. Moreover, the respective programs executed by the apparatuses according to any of the embodiments can be provided or distributed via a network such as the Internet. Furthermore, the respective programs executed by the apparatuses according to any of the embodiments can be provided in such a manner that the programs are each built into a ROM or the like in advance.

The respective programs executed by the apparatuses according to any of the embodiments are each composed of modules for realizing the above-described units on a computer. As actual hardware, a CPU reads out each program from a ROM onto a RAM and executes the program, thereby the above-described function units are realized on the computer.

According to the present invention, there is achieved an effect that it is possible to meet a wide range of demands on the provision of a service.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums, which may be provided as computer program products, include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A system comprising:
one or more information processing apparatuses, the one or more information processing apparatuses being different ones of a plurality of types of potential analysis devices each having an expected user associated therewith that varies amongst the plurality of types of the potential analysis devices based on the type of the potential analysis device; and
a printer device, the printer device being one of the plurality of types of potential analysis devices, the printer device including,
first processing circuitry configured to,
store, at a first time, analyzer information including a flag indicating which of the printer device and the one or more information processing apparatuses are selectable as an analysis device such that multiple ones of the printer device and the one or more information processing apparatuses are concurrently selectable as the analysis device,
select, at a second time subsequent to the first time, at least one of the printer device and the one or more information processing apparatuses as the analysis device using the flag in the analyzer information, the expected user of the analysis device having a level of knowledge set based on which one of the plurality of types of the potential analysis devices is associated with the analysis device, and
when a paper jam error is occurred in the printer device and the printer device has been selected as the analysis device, estimate an estimated slip amount from information for estimating the slip amount to generate device information, determine whether the estimated slip amount is (i) greater than or equal to a first threshold and less than a second threshold greater than the first threshold, or (ii) greater than or equal to the second threshold, determine a service to be provided to the printer device based on the device information indicating the estimated slip amount such that, if the estimated slip amount is greater than or equal to the first threshold and less than the second threshold, the analysis device determines a cleaning of a paper feeding roller associated with the printer device as the service, and if the estimated slip amount is greater than or equal to the second threshold, the analysis device determines a replacement of the paper feeding roller associated with the printer device as the service, and display service information relating to the service to be provided on a display of the printer device such that the service information provides instructions on how to clean or replace the paper feeding roller and a depth of detail of the instructions varies based on the level of knowledge set for the expected user of the analysis device by reading the service information from different storage areas based on which of the potential analysis devices is selected as the analysis device.

2. The system according to claim 1, wherein the one or more information processing apparatuses include one or more of an information processing system run by a maintenance company of the printer device, a user terminal owned by a user of the printer device, and a staff terminal owned by maintenance staff of the printer device, the printer device is configured to select the analysis device based on analyzer information that indicates any one of the information processing system, the user terminal, the staff terminal, and the printer device as the analysis device, the information processing system includes second processing circuitry configured to receive, via a network, the device information from the printer device when the information processing system is determined as the analysis device, to perform an analysis based on the device information received by the information processing system, and to determine the service to the printer device based on a result of the analysis performed by the information processing system, the user terminal includes third processing circuitry configured to receive, via the network, the device information from the printer device when the user terminal is determined as the analysis device, perform an analysis based on the device information received by the user terminal, and to determine a service to the printer device based on a result of the analysis performed by the user terminal, the staff terminal includes fourth processing circuitry configured to receive, via the network, the device information from the printer device when the staff terminal is determined as the analysis device, to perform an analysis based on the device information received by the staff terminal, and to determine the service to the printer device based on a result of the analysis performed by the staff terminal, and the first processing circuitry associated with the printer device is configured to transmit, via the network, the device information to the analysis device when any one of the information processing system, the user terminal, and the staff terminal is determined as the analysis device, to perform an analysis based on the device information when the printer device has been determined as the analysis device, and to determine the service to the printer device based on a result of the analysis performed by the printer device.

3. The system according to claim 2, wherein the second processing circuitry associated with the information processing system is configured to output the service information on the service determined by the information processing system, the third processing circuitry associated with the user terminal is configured to output service information on the service determined by the user terminal, the fourth processing circuitry associated with the staff terminal is configured to output service information on the service determined by the staff terminal, and the first processing circuitry associated with the printer device is configured to output service information on the service determined by the printer device.

4. The system according to claim 3, wherein the second processing circuitry associated with the information processing system is further configured to, determine an output destination of the service information on the service determined by the information processing system based on output destination information, the output destination information associating service identification information identifying a service with output-destination identification information identifying an output destination that is any one of the information processing system, the user terminal, the staff terminal, and the printer device, transmit, via the network, the service identification information of the service to the output destination when any one of the user terminal, the staff terminal, and the printer device is determined as the output destination, and output the service information when the information processing system is determined as the output destination.

5. The system according to claim 3, wherein the third processing circuitry associated with the user terminal is further configured to, receive, via the network, service identification information from either the information processing system or the printer device, and output service information on a service indicated by the service identification information, when the user terminal receives the service identification information.

6. The system according to claim 3, wherein the third processing circuitry associated with the user terminal is configured to output the service information whose content is appropriate for the user.

7. The system according to claim 3, wherein the fourth processing circuitry associated with the staff terminal is further configured to, receive service identification information from either the information processing system or the printer device, and output service information on a service indicated by the service identification information, when the staff terminal receives the service identification information.

8. The system according to claim 3, wherein the fourth processing circuitry associated with staff terminal is configured to output the service information whose content is appropriate for the maintenance staff.

9. The system according to claim 3, wherein the first processing circuitry associated with the printer device is further configured to,
determine an output destination of the service information on the service determined by the printer device based on output destination information, the output destination information associating service identification information identifying a service with output-destination identification information identifying an output destination that is any one of the user terminal, the staff terminal, and the printer device,
transmit, via the network, the service identification information of the service to the output destination when the user terminal or the staff terminal is determined as the output destination,
receive, via the network, service identification information from the information processing system,
output the service information on the service determined by the printer device, when the printer device is determined as the output destination, and
output service information on a service indicated by the service identification information, when the printer device receives the service identification information.

10. The system according to claim 3, wherein the first processing circuitry associated with device is configured to output the service information whose content is appropriate for the user and the maintenance staff.

11. The system according to claim 2, wherein the second processing circuitry associated with the information processing system is configured to determine the service to the device based on user information on the user in addition to the result of the analysis.

12. A service determining method implemented by a system, the system including a printer device and one or more information processing apparatuses, the printer device and the one or more information processing apparatuses being different ones of a plurality of types of potential analysis devices each having an expected user associated therewith that varies amongst the plurality of types of the potential analysis devices based on the type of the potential analysis device, the service determining method comprising:
storing, at a first time, analyzer information including a flag indicating which of the printer device and the one or more information processing apparatuses are selectable as an analysis device such that multiple ones of the printer device and the one or more information processing apparatuses are concurrently selectable as the analysis device,
selecting, by the printer device a second time subsequent to the first time, at least one of the one or more information processing apparatuses and the printer device as an analysis device using the flag in the analyzer information the expected user of the analysis device having a level of knowledge set based on which one of the plurality of types of the potential analysis devices is associated with the analysis device; and
when a paper jam error is occurred in the printer device and the printer device has been selected as the analysis device,
estimating an estimated slip amount from information for estimating the slip amount to generate device information,
determining whether the estimated slip amount is (i) greater than or equal to a first threshold and less than a second threshold greater than the first threshold, or (ii) greater than or equal to the second threshold,
determining a service to be provided to the printer device based on the device information indicating the estimated slip amount such that,
if the estimated slip amount is greater than or equal to the first threshold and less than the second threshold, the analysis device determines a cleaning of a paper feeding roller associated with the printer device as the service, and
if the estimated slip amount is greater than or equal to the second threshold, the analysis device determines a replacement of the paper feeding roller associated with the printer device as the service, and
displaying service information relating to the service to be provided on a display of the printer device such that the service information provides instructions on how to clean or replace the paper feeding roller and a depth of detail of the instructions based on the level of knowledge set for the expected user of the analysis device by reading the service information from different storage areas based on which of the potential analysis devices is selected as the analysis device.

13. A non-transitory computer readable medium storing a computer program product executable on a system including a printer device and one or more information processing apparatuses, the printer device and the one or more information processing apparatuses being different ones of a plurality of types of potential analysis devices each having an expected user associated therewith that varies amongst the different types of the potential analysis devices, the computer program product, when executed, configures the system to,
store, at a first time, analyzer information including a flag indicating which of the printer device and the one or more information processing apparatuses are selectable as an analysis device such that multiple ones of the printer device and the one or more information processing apparatuses are concurrently selectable as the analysis device;
select, by the printer device at a second time subsequent to the first time, at least one of the one or more information processing apparatuses and the printer device as the analysis device using the flag in the analyzer information, the expected user of the analysis device having a level of knowledge set based on which one of the plurality of types of the potential analysis devices is associated with the analysis device; and
when a paper jam error is occurred in the printer device and the printer device has been selected as the analysis device,
estimate an estimated slip amount from information for estimating the slip amount to generate device information,
determine whether the estimated slip amount is (i) greater than or equal to a first threshold and less than a second threshold greater than the first threshold, or (ii) greater than or equal to the second threshold, determine a service to be provided to the printer device based on the device information indicating the estimated slip amount such that, if the estimated slip amount is greater than or equal to the first threshold and less than the second threshold, the analysis device determines a cleaning of a paper feeding roller associated with the printer device as the service, and if the estimated slip amount is greater than or equal to the second threshold, the analysis device determines a replacement of the paper feeding roller associated with the printer device as the service, and display service information relating to the service to be provided on a display of the printer device such that the service information provides instructions on how to clean or replace the paper feeding roller and a depth of detail of the instructions varies based on the level of knowledge set for the expected user of the analysis device by reading the service information from different storage areas based on which of the potential analysis devices is selected as the analysis device.

14. The method according to claim 12, wherein the one or more information processing apparatuses include one or more of an information processing system run by a maintenance company of the printer device, a user terminal owned by a user of the printer device, and a staff terminal owned by maintenance staff of the printer device.

15. The method according to claim 14, wherein the selecting, by the printer device, the analysis device includes selecting the analysis device based on analyzer information that indicates any one of the information processing system, the user terminal, the staff terminal, and the printer device as the analysis device.

16. The non-transitory computer readable medium according to claim 13, wherein the one or more information processing apparatuses include one or more of an information processing system run by a maintenance company of the printer device, a user terminal owned by a user of the printer device, and a staff terminal owned by maintenance staff of the printer device.

17. The non-transitory computer readable medium according to claim 16, wherein the computer program product, when executed, configures the printer device to select the analysis device based on analyzer information that indicates any one of the information processing system, the user terminal, the staff terminal, and the printer device as the analysis device.

* * * * *